(12) United States Patent
Murata et al.

(10) Patent No.: US 11,454,838 B2
(45) Date of Patent: Sep. 27, 2022

(54) LIQUID CRYSTAL DISPLAY DEVICE

(71) Applicant: SHARP KABUSHIKI KAISHA, Sakai (JP)

(72) Inventors: Koji Murata, Sakai (JP); Kazutaka Hanaoka, Sakai (JP); Shinji Shimada, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/555,163

(22) Filed: Dec. 17, 2021

(65) Prior Publication Data

US 2022/0197067 A1 Jun. 23, 2022

Related U.S. Application Data

(60) Provisional application No. 63/129,294, filed on Dec. 22, 2020.

(51) Int. Cl.
| | |
|---|---|
| *G02F 1/13* | (2006.01) |
| *G02F 1/1343* | (2006.01) |
| *G02F 1/13357* | (2006.01) |
| *G02F 1/1335* | (2006.01) |
| *G02F 1/1337* | (2006.01) |

(52) U.S. Cl.
CPC ........ *G02F 1/1323* (2013.01); *G02F 1/13439* (2013.01); *G02F 1/133524* (2013.01); *G02F 1/133528* (2013.01); *G02F 1/133615* (2013.01); *G02F 1/133769* (2021.01)

(58) Field of Classification Search
CPC .................................................... G02F 1/1323
See application file for complete search history.

(56) References Cited

U.S. PATENT DOCUMENTS

| | | | |
|---|---|---|---|
| 2007/0040780 A1 | 2/2007 | Gass et al. | |
| 2007/0146606 A1 | 6/2007 | Yamashita | |
| 2011/0012924 A1 | 1/2011 | Gass et al. | |
| 2012/0056914 A1 | 3/2012 | Gass et al. | |
| 2012/0147026 A1 | 6/2012 | Gass et al. | |
| 2015/0070620 A1* | 3/2015 | Hirosawa | G02F 1/133555 349/46 |

FOREIGN PATENT DOCUMENTS

| | | |
|---|---|---|
| JP | 2007-178907 A | 7/2007 |
| JP | 2011-253206 A | 12/2011 |

* cited by examiner

*Primary Examiner* — Edmond C Lau
(74) *Attorney, Agent, or Firm* — ScienBiziP, P.C.

(57) ABSTRACT

Provided is a liquid crystal display device including: a liquid crystal panel; and a control circuit, the liquid crystal panel sequentially including an active matrix substrate, a first alignment film, a liquid crystal layer, a second alignment film, and a counter substrate, the active matrix substrate sequentially including a first substrate, a first electrode, a first insulating layer, and a second electrode including a linear electrode portion, the counter substrate including a second substrate and a third electrode, the third electrode extending in a longitudinal direction of the sub-pixel at a right or left end of the sub-pixel, a ratio of a width of the third electrode to a width of the first electrode in a widthwise direction being 0.14 or greater and 0.25 or smaller, the control circuit being configured to switch between application of an alternating voltage and application of a constant voltage to the third electrode.

9 Claims, 29 Drawing Sheets

| Display mode | Example 1 | |
|---|---|---|
| | Second display mode | First display mode |
| Counter voltage (V) | 0 | 4 |
| Simulation figure of contrast ratios | [V=(#9,4.000)/(#1,0.000)V]<br>Contrast ratio contour<br>(Transmittance) | [V=(#10,4.500)/(#1,0.000)V]<br>Contrast ratio contour<br>(Transmittance) |
| Maximum contrast ratio | 1005 (Front) | 56 (Polar angle 30°) |

| Display mode | Comparative Example 1 | |
|---|---|---|
| | Second display mode | First display mode |
| Counter voltage (V) | 0 | 4 |
| Simulation figure of contrast ratios | [V=(#8:3.500)/(#1:0.000)V]<br>Contrast ratio contour<br>(Transmittance) | [V=(#12:5.500)/(#1:0.000)V]<br>Contrast ratio contour<br>(Transmittance) |
| Maximum contrast ratio | 819 (Front) | 13 (Front) |

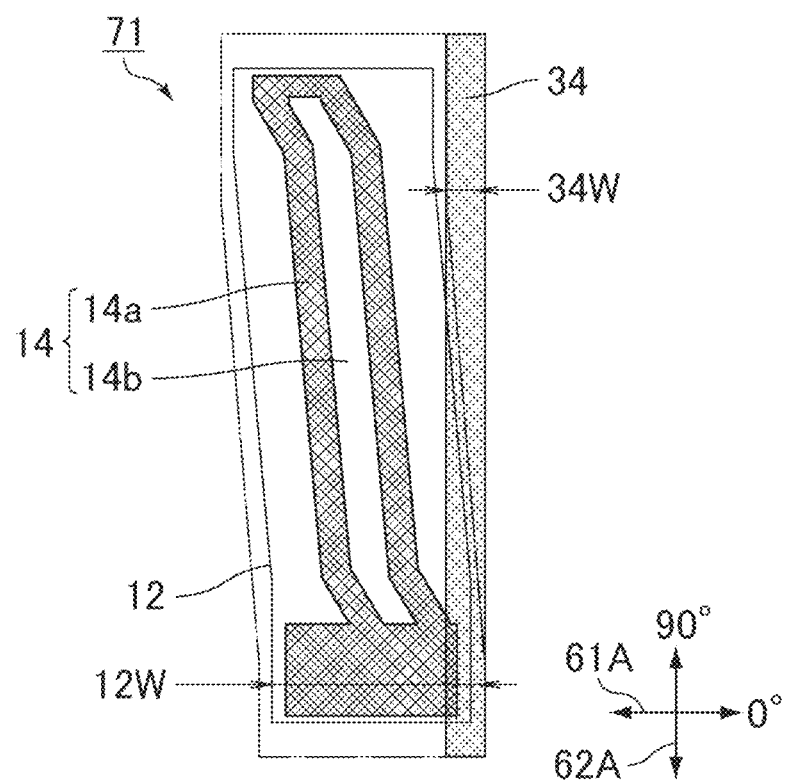

FIG.30

| | Comparative Example 1 | Comparative Example 2 | Comparative Example 3 | Example 2 | Example 1 | Comparative Example 4 |
|---|---|---|---|---|---|---|
| Figure showing corresponding electrode arrangement in plan view | FIG.23 | FIG.27 | FIG.28 | FIG.26 | FIG.3 | FIG.29 |
| Width of third electrode (μm) | 20.2 | 15.2 | 10.1 | 5.1 | 2.9 | 2.2 |
| Width of first electrode (μm) | 20.2 | 20.2 | 20.2 | 20.2 | 20.2 | 20.2 |
| α (Width of third electrode /Width of first electrode) | 1.00 | 0.75 | 0.50 | 0.25 | 0.14 | 0.11 |
| Thickness of liquid crystal layer (μm) | 3.3 | 3.3 | 3.3 | 3.3 | 3.3 | 3.3 |
| Simulation figure of contrast ratios | [V=(#12.500)V/(#10.000)V] [XY=mean] [Wave=589.0nm] Contrast ratio contour (Transmittance) | [V=(#11.500)V/(#10.000)V] [XY=mean] [Wave=589.0nm] Contrast ratio contour (Transmittance) | [V=(#11.500)V/(#10.000)V] [XY=mean] [Wave=589.0nm] Contrast ratio contour (Transmittance) | [V=(#11.500)V/(#10.000)V] [XY=mean] [Wave=589.0nm] Contrast ratio contour (Transmittance) | [V=(#10.4500)V/(#10.000)V] [XY=mean] [Wave=589.0nm] Contrast ratio contour (Transmittance) | [V=(#10.4500)V/(#10.000)V] [XY=mean] [Wave=589.0nm] Contrast ratio contour (Transmittance) |
| Maximum contrast ratio | 13 (Front) | 15 (Front) | 17 (Front) | 53 (Polar angle 30°) | 78 (Polar angle 30°) | 711 (Front) |

FIG.34

| | Comparative Example 5 | Comparative Example 6 | Example 3 | Example 4 | Comparative Example 7 |
|---|---|---|---|---|---|
| Figure showing corresponding electrode arrangement in plan view | FIG.27 | FIG.28 | FIG.26 | FIG.3 | FIG.29 |
| Width of third electrode (μm) | 15.2 | 10.1 | 5.1 | 2.9 | 2.2 |
| Width of first electrode (μm) | 20.2 | 20.2 | 20.2 | 20.2 | 20.2 |
| α (Width of third electrode /Width of first electrode) | 0.75 | 0.50 | 0.25 | 0.14 | 0.11 |
| Thickness of liquid crystal layer (μm) | 2.6 | 2.6 | 2.6 | 2.6 | 2.6 |
| Simulation figure of contrast ratios | [V=(#115,000) /(#10,000)V] 90.0 180.0— 54 —0.0 [deg] 270.0 80.0 [deg] [X,Y=mean] [Wave=589.0nm] Contrast ratio contour (Transmittance) | [V=(#115,000) /(#10,000)V] 90.0 180.0— 94 —0.0 [deg] 270.0 80.0 [deg] [X,Y=mean] [Wave=589.0nm] Contrast ratio contour (Transmittance) | [V=(#115,000) /(#10,000)V] 90.0 180.0— 162 —0.0 [deg] 270.0 80.0 [deg] [X,Y=mean] [Wave=589.0nm] Contrast ratio contour (Transmittance) | [V=(#115,000) /(#10,000)V] 90.0 180.0— 372 —0.0 [deg] 270.0 80.0 [deg] [X,Y=mean] [Wave=589.0nm] Contrast ratio contour (Transmittance) | [V=(#115,000) /(#10,000)V] 90.0 180.0— 768 —0.0 [deg] 270.0 80.0 [deg] [X,Y=mean] [Wave=589.0nm] Contrast ratio contour (Transmittance) |
| Maximum contrast ratio | 54 (Front) | 94 (Front) | 162 (Polar angle 20°) | 372 (Polar angle 30°) | 768 (Front) |

FIG.35

| | Comparative Example 8 | Comparative Example 9 | Example 5 | Example 6 | Comparative Example 10 |
|---|---|---|---|---|---|
| Figure showing corresponding electrode arrangement in plan view | FIG.27 | FIG.28 | FIG.26 | FIG.3 | FIG.29 |
| Width of third electrode (μm) | 15.2 | 10.1 | 5.1 | 2.9 | 2.2 |
| Width of first electrode (μm) | 20.2 | 20.2 | 20.2 | 20.2 | 20.2 |
| α (Width of third electrode / Width of first electrode) | 0.75 | 0.50 | 0.25 | 0.14 | 0.11 |
| Thickness of liquid crystal layer (μm) | 2.2 | 2.2 | 2.2 | 2.2 | 2.2 |
| Simulation figure of contrast ratios | Contrast ratio contour (Transmittance) | Contrast ratio contour (Transmittance) | Contrast ratio contour (Transmittance) | Contrast ratio contour (Transmittance) | Contrast ratio contour (Transmittance) |
| Maximum contrast ratio | 54 (Front) | 94 (Front) | 162 (Polar angle 20°) | 372 (Polar angle 30°) | 768 (Front) |

FIG.36

| Display mode | Example 9 | |
|---|---|---|
| | Second display mode | First display mode |
| Counter voltage (V) | 0 | 3 |
| Simulation figure of contrast ratios | [V=(#9:4.000)/(#1:0.000)V]<br>Contrast ratio contour<br>(Transmittance) | [V=(#10:4.500)/(#1:0.000)V]<br>Contrast ratio contour<br>(Transmittance) |
| Maximum contrast ratio | 1005 (Front) | 522 or greater (Polar angle 30°) |

LIQUID CRYSTAL DISPLAY DEVICE

CROSS-REFERENCE TO RELATED APPLICATIONS

The present application claims priority under 35 U.S.C. § 119 to U.S. provisional Patent Application No. 63/129,294 filed on Dec. 22, 2020, the contents of which are incorporated herein by reference in their entirety.

BACKGROUND OF THE INVENTION

Field of the Invention

The present invention relates to a liquid crystal display device.

Description of Related Art

Liquid crystal display devices are display devices utilizing a liquid crystal composition to display images. In a typical display mode thereof, voltage is applied to a liquid crystal composition sealed between paired substrates such that the alignment of liquid crystal molecules in the liquid crystal composition is changed according to the applied voltage, whereby the amount of light passing through the paired substrates is controlled. Such liquid crystal display devices have advantageous features such as thin profile, light weight, and low power consumption, and are therefore used in a variety of fields.

Studies to enhance the viewing angle characteristics of liquid crystal display devices have been made such that the same image can be observed regardless of whether the viewing angle range is narrow or wide. Meanwhile, a display method considered in terms of privacy protection is one that allows observation of an image in a narrow viewing angle range but makes the image difficult to observe in a wide viewing angle range. For example, JP 2007-178907 A discloses a liquid crystal display device having an FFS structure generating a lateral electric field between a first electrode and a second electrode on a first substrate, wherein a third electrode for generating a vertical electric field with the first electrode and the second electrode is arranged on a second substrate facing the first substrate. Here, the liquid crystal display device is meant to control the vertical electric field for viewing angle control.

Also, JP 2011-253206 A discloses a liquid crystal display device including a liquid crystal display panel, first and second sets of regions in the liquid crystal display panel, and circuitry being adapted to apply an electric field in first and second different ways in the first and second sets of regions respectively, wherein a display can be switched between a public mode and a private mode, and a masking image is displayed in the private mode. Herein, this technique is referred to as a veil-view technique (function).

BRIEF SUMMARY OF THE INVENTION

In observation of an image provided by a liquid crystal display device in a narrow viewing angle range, the viewing angle characteristics are typically similar between observation from the left direction and observation from the right direction. However, liquid crystal display devices in some applications are required to provide different viewing angle characteristics between observation from the right direction and observation from the left direction, to allow a less observable display image from one of the directions. The liquid crystal display device disclosed in JP 2007-178907 A allows poor viewing angle characteristics in observation from the left-right directions without giving a significant change in the viewing angle characteristics in observation from the up-down directions. Unfortunately, the document fails to discuss changing the viewing angle characteristics between observation from the right direction and observation from the left direction.

In response to the above issues, an object of the present invention is to provide a liquid crystal display device capable of providing display with different viewing angle characteristics between observation from the left direction and observation from the right direction.

(1) One embodiment of the present invention is directed to a liquid crystal display device including: a liquid crystal panel; and a control circuit, the liquid crystal panel including sub-pixels arranged in a matrix pattern in an in-plane direction and sequentially including an active matrix substrate, a first alignment film, a liquid crystal layer containing liquid crystal molecules, a second alignment film, and a counter substrate, the active matrix substrate sequentially including a first substrate, a first electrode disposed for each sub-pixel, a first insulating layer, and a second electrode including a linear electrode portion, the counter substrate including a second substrate and a third electrode, the third electrode extending in a longitudinal direction of the sub-pixel at a right end or a left end of the sub-pixel with a widthwise direction of the sub-pixel defined as a left-right direction, a ratio of a width of the third electrode in the widthwise direction to a width of the first electrode in the widthwise direction being 0.14 or greater and 0.25 or smaller, the control circuit being configured to switch between application of an alternating voltage and application of a constant voltage to the third electrode.

(2) In an embodiment of the present invention, the liquid crystal display device includes the structure (1), the control circuit is configured to switch between a first display mode that allows a first image to be observable in a narrow viewing angle range including a direction normal to the liquid crystal panel and a second display mode that allows the first image to be observable in a wide viewing angle range including the narrow viewing angle range, the control circuit applies an alternating voltage to the third electrode in the first display mode, and the control circuit applies a constant voltage, which is common to the first electrode or the second electrode, to the third electrode in the second display mode.

(3) In an embodiment of the present invention, the liquid crystal display device includes the structure (2), the liquid crystal panel includes display units that utilize a veil-view function to display an image, the display units each include a pair of sub-pixels arranged adjacent to each other, one of the sub-pixels being a first sub-pixel selected from odd-number lines and the other being a second sub-pixel selected from even-number lines, and the control circuit is configured to supply different image signals to the respective sub-pixels so as to allow a second image, different from the first image, to be observable in the wide viewing angle range.

(4) In an embodiment of the present invention, the liquid crystal display device includes any one of the structures (1) to (3), and the third electrode does not overlap the linear electrode portion of the second electrode in a plan view.

(5) In an embodiment of the present invention, the liquid crystal display device includes any one of the structures (1) to (4), and the counter substrate includes a dielectric layer between the third electrode and the second alignment film.

(6) In an embodiment of the present invention, the liquid crystal display device includes any one of the structures (1) to (5), and the first alignment film or the second alignment film has an anchoring energy of $1 \times 10^{-7}$ J/m$^2$ or less.

(7) In an embodiment of the present invention, the liquid crystal display device includes any one of the structures (1) to (6), and the liquid crystal panel is further provided with a first polarizer on the active matrix substrate side, a second polarizer on the counter substrate side, and a retardation film between the active matrix substrate and the first polarizer.

(8) In an embodiment of the present invention, the liquid crystal display device includes any one of the structures (1) to (7), the liquid crystal display device further includes a backlight on an active matrix substrate side of the liquid crystal panel, and the backlight includes: a light guide plate whose left-right direction correspond to the widthwise direction of each sub-pixel of the liquid crystal panel; two light sources individually disposed on a right side surface and a left side surface of the light guide plate; a reflector on a back surface of the light guide plate; and an optical film between the light guide plate and the liquid crystal panel.

(9) In an embodiment of the present invention, the liquid crystal display device includes the structure (8), the control circuit is configured to switch between a first display mode that allows a first image to be observable in a narrow viewing angle range including a direction normal to the liquid crystal panel and a second display mode that allows the first image to be observable in a wide viewing angle range including the narrow viewing angle range, and in the first display mode, the control circuit turns on the light source on the left side surface of the light guide plate of the two light sources when the third electrode is at the right end of the sub-pixel, and turns on the light source on the right side surface of the light guide plate of the two light sources when the third electrode is at the left end of the sub-pixel.

The present invention can provide a liquid crystal display device capable of providing display with different viewing angle characteristics between observation from the left direction and observation from the right direction.

BRIEF DESCRIPTION OF THE DRAWINGS

FIG. 29 is a schematic plan view showing arrangement of electrodes in one sub-pixel of a liquid crystal display device according to Comparative Example 4.

FIG. 30 is a table summarizing simulation results in the first display mode in Examples 1 and 2 and Comparative Examples 1 to 4.

FIG. 34 is a table summarizing simulation results in the first display mode in Examples 3 and 4 and Comparative Examples 5 to 7.

FIG. 35 is a table summarizing simulation results in the first display mode in Examples 5 and 6 and Comparative Examples 8 to 10.

FIG. 36 is a table summarizing simulation results of display-mode switching in Example 9.

DETAILED DESCRIPTION OF THE INVENTION

Hereinafter, an embodiment of the present invention is described. The present invention is not limited to the following embodiment, and the design of the present invention can be modified as appropriate within the range satisfying the configuration of the present invention. Hereinafter, like reference signs refer to the same portions or the portions having the same function throughout the drawings, and redundant description of already described portions is omitted as appropriate. The modes in the present invention may appropriately be combined within the gist of the present invention.

The liquid crystal display device according to the embodiment of the present invention includes: a liquid crystal panel; and a control circuit, the liquid crystal panel including sub-pixels arranged in a matrix pattern in an in-plane direction and sequentially including an active matrix substrate, a first alignment film, a liquid crystal layer containing liquid crystal molecules, a second alignment film, and a counter substrate, the active matrix substrate sequentially including a first substrate, a first electrode disposed for each sub-pixel, a first insulating layer, and a second electrode including a linear electrode portion, the counter substrate including a second substrate and a third electrode, the third electrode extending in a longitudinal direction of the sub-pixel at a right end or a left end of the sub-pixel with a widthwise direction of the sub-pixel defined as a left-right direction, a ratio of a width of the third electrode in the widthwise direction to a width of the first electrode in the widthwise direction being 0.14 or greater and 0.25 or smaller, the control circuit being configured to switch between application of an alternating voltage and application of a constant voltage to the third electrode.

Figure 1:
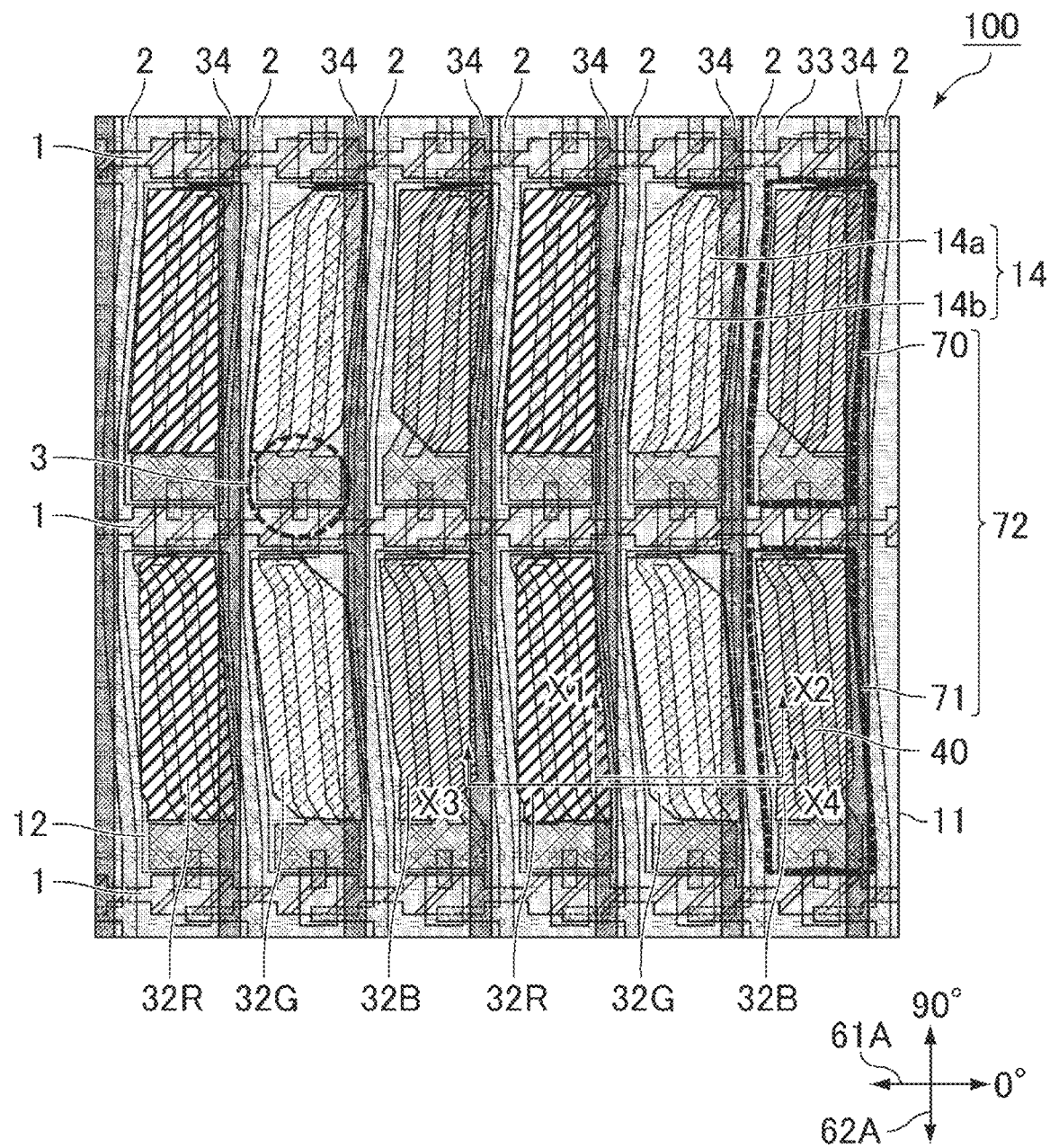
FIG. 1 is a schematic plan view of an exemplary liquid crystal display device according to an embodiment.
Figure 2:
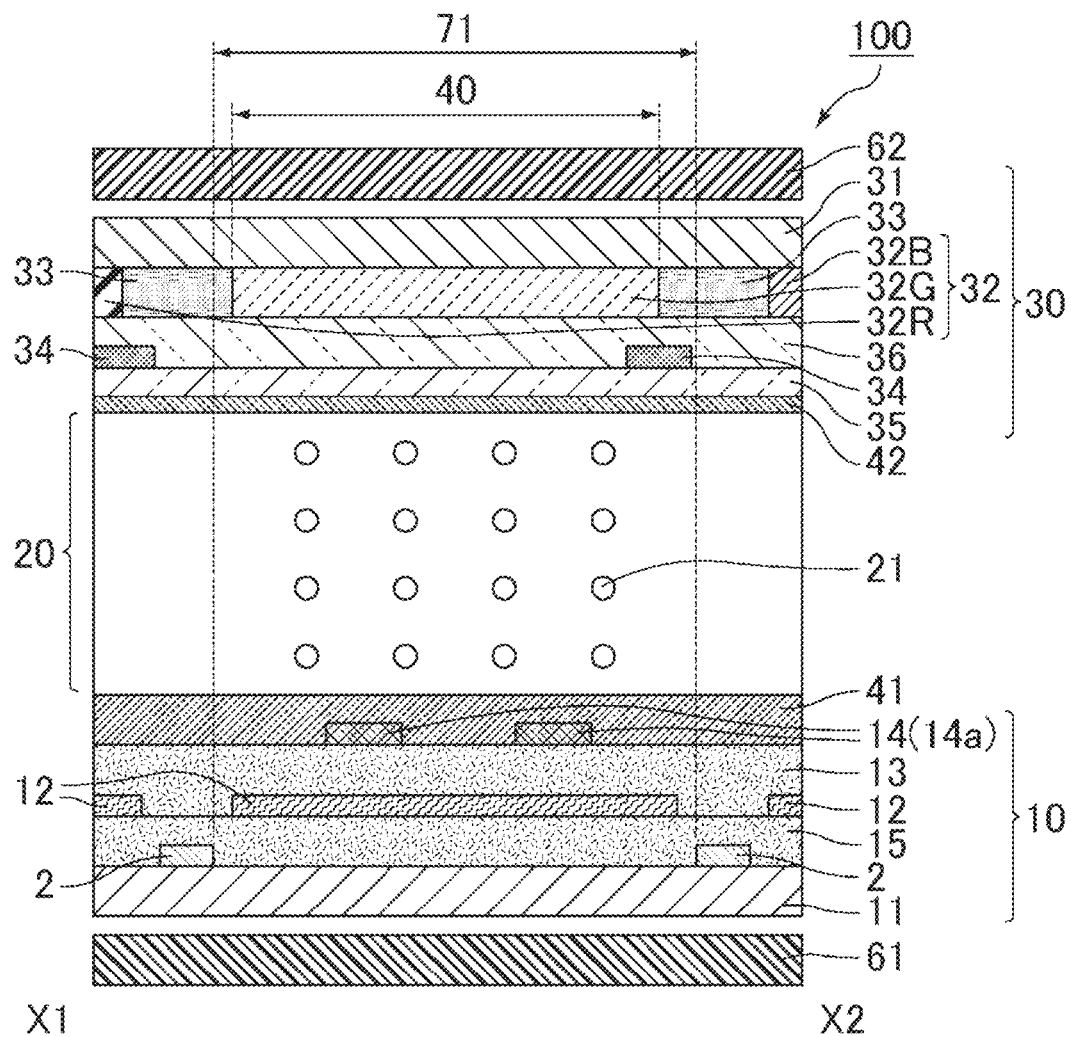
FIG. 2 is a schematic cross-sectional view taken along the line X1-X2 in FIG. 1.

The liquid crystal display device according to the embodiment is described below with reference to the drawings. FIG. 1 is a schematic plan view of an exemplary liquid crystal display device according to the embodiment. FIG. 2 is a schematic cross-sectional view taken along the line X1-X2 in FIG. 1. As shown in FIG. 1, a liquid crystal panel 100 includes sub-pixels arranged in a matrix pattern in an in-plane direction. An active matrix substrate 10 includes on a first substrate 11 parallel gate lines 1 and parallel source lines 2 intersecting the gate lines 1 via an insulating film. The gate lines 1 and the source lines 2 are arranged in a grid pattern as a whole. The "sub-pixel" as used herein refers to a region surrounded by two adjacent gate lines 1 and two adjacent source lines 2 on the first substrate 11 as shown in FIG. 1. In FIG. 1, a first sub-pixel 70 and a second sub-pixel 71 are adjacent in the column direction. The first sub-pixel 70 and the second sub-pixel 71 are each simply referred to as a "sub-pixel" when no particular distinguishment is needed therebetween.

At each intersection of the gate lines 1 and the source lines 2 is disposed a thin film transistor (TFT) 3 as a switching element. Examples of the material for the gate lines 1 and the source lines 2 include metal materials such as aluminum, copper, titanium, molybdenum, chromium, and an alloy of any of these. Examples of the first substrate 11 and the later-described second substrate 31 include, but are not limited to, substrates made of a resin such as polycarbonate and glass substrates.

As shown in FIG. 1, each sub-pixel is preferably provided with an optical opening 40 that allows light to pass through the liquid crystal panel 100. In FIG. 1, the optical openings 40 are portions surrounded by dotted lines. In the case where the liquid crystal panel 100 is a transmissive one, the optical opening 40 is a region that allows light emitted from the back surface of the liquid crystal panel 100 to travel toward the front surface of the liquid crystal panel 100. In the case where the liquid crystal panel 100 is a reflective one, the optical opening 40 is a region that allows incident light, which enters from the outside of the liquid crystal panel 100, and reflected light, which is the incident light emitted toward the outside of the liquid crystal panel 100 after being reflected inside the liquid crystal panel 100, to pass through the liquid crystal panel 100. The optical opening 40 may be superimposed with, for example, a transparent component such as a polarizer or a color filter in a plan view.

As shown in FIG. 2, the liquid crystal panel 100 sequentially includes the active matrix substrate 10, a first alignment film 41, a liquid crystal layer 20 containing liquid crystal molecules 21, a second alignment film 42, and a counter substrate 30. Herein, the side closer to the display screen of the liquid crystal display device is also referred to as the "viewer side (front surface side)", and the side farther from the display screen is also referred to as the "back surface side".

The liquid crystal panel 100 may include a first polarizer 61 on the active matrix substrate 10 side and a second polarizer 62 on the counter substrate 30 side. The active matrix substrate 10 side of the liquid crystal panel 100 means the side of the active matrix substrate 10 remote from the liquid crystal layer 20, and the counter substrate 30 side of the liquid crystal panel 100 means the side of the counter substrate 30 remote from the liquid crystal layer 20. The first polarizer 61 and the second polarizer 62 are preferably linearly polarizers. An absorption axis 61A of the first polarizer 61 and an absorption axis 62A of the second polarizer 62 are preferably arranged in the crossed Nicols such that they are perpendicular to each other. Herein, in a front plan view of the liquid crystal panel with the absorption axis 61A of the first polarizer 61 defined to be at the 0°-180° azimuths and the absorption axis 62A of the second polarizer 62 defined to be at the 90°-270° azimuths, the left-right directions mean the 0°-180° azimuths, the up-down directions mean the 90°-270° azimuths, the oblique direction means at least one of the 45° azimuth, the 135° azimuth, the 225° azimuth, or the 315° azimuth.

As shown in FIG. 2, the active matrix substrate 10 sequentially includes the first substrate 11, first electrodes 12 disposed for the respective sub-pixels, a first insulating layer 13, and second electrodes 14 each including linear electrode portions 14a. In other words, the active matrix substrate 10 has a fringe field switching (FFS) electrode structure in which the first electrodes 12 and the second electrodes 14 are stacked via the first insulating layer 13. On the first substrate 11 may be disposed the source lines 2 and a second insulating layer 15, and on the second insulating layer 15 may be disposed the first electrodes 12. Examples of the material for the first insulating layer 13 and the second insulating layer 15 include inorganic materials such as silicon oxide and silicon nitride.

Figure 3:
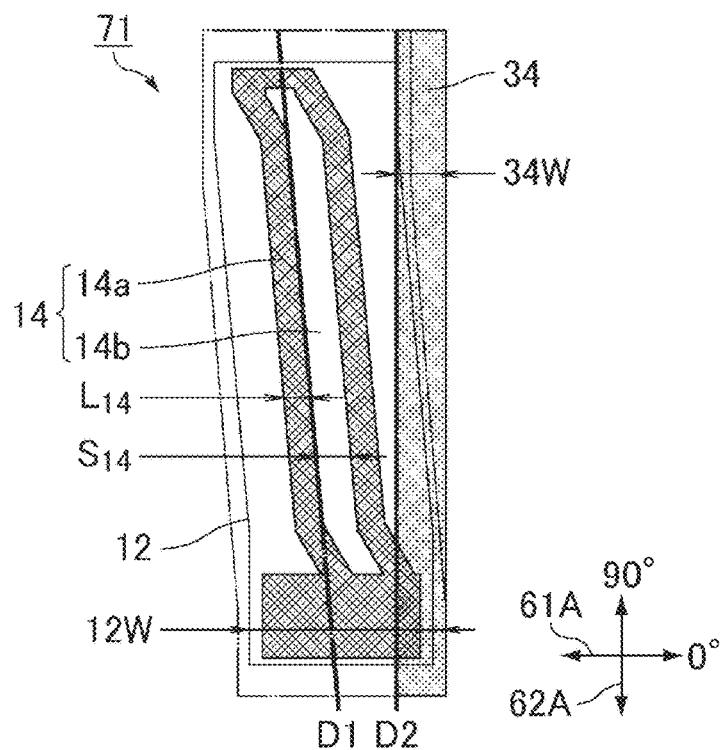
FIG. 3 is a schematic plan view showing arrangement of a first electrode, a second electrode, and a third electrode in one sub-pixel.

FIG. 3 is a schematic plan view showing arrangement of a first electrode, a second electrode, and a third electrode in one sub-pixel. As shown in FIG. 3, the first electrode 12 and the second electrode 14 are each disposed for each sub-pixel. The first electrode 12 is preferably a planar electrode. The "planar electrode" herein means an electrode without slits or openings in at least in the region superimposed with the optical opening 40 of the corresponding sub-pixel in a plan view. The first electrode 12 in a plan view preferably overlaps at least the later-described linear electrode portions 14a of the second electrode 14.

Each second electrode 14 includes the linear electrode portions 14a. Each second electrode 14 has a planar shape in which the linear electrode portions 14a are closed at both ends as shown in FIG. 3, for example. Each second electrode 14 may be provided with an opening 14b surrounded by electrode portions. As shown in FIG. 3, the linear electrode portions 14a are each a portion extending in a certain direction (extending direction D1). The second electrode 14, as shown in FIG. 3, may include a different electrode portion that is different from the linear electrode portions 14a and extends in a direction different from the extending direction D1. The extending direction D1 of each linear electrode portion 14a may form an angle of 0° to 5° with one of the absorption axis 61A of the first polarizer 61 and the absorption axis 62A of the second polarizer 62. The linear electrode portions 14a may extend in the longitudinal directions of the sub-pixel. One linear electrode portion 14a may have an electrode width $L_{14}$ of 2 μm or greater and 5 μm or smaller, and adjacent linear electrode portions 14a may have a distance (width of the opening) $S_{14}$ of 2 μm or greater and 5 μm or smaller.

For example, the second electrodes 14 disposed for the respective sub-pixels may be electrically connected to each other and may apply a common constant voltage to the sub-pixels, and the first electrodes 12 disposed for the respective sub-pixels may each be electrically connected to the corresponding source line 2 via the semiconductor layer of the corresponding TFT 3 and may apply different magnitudes of voltage to the sub-pixels in response to image signals. Alternatively, the second electrodes 14 may each be electrically connected to the corresponding source line 2 via the semiconductor layer of the corresponding TFT 3 and may apply different magnitudes of voltage to the sub-pixels in response to image signals, and the first electrodes 12 may be electrically connected to each other and may apply a common constant voltage to the sub-pixels.

As shown in FIG. 2, the counter substrate 30 includes the second substrate 31 and third electrodes 34. The third electrodes 34 may be disposed for the respective sub-pixels or may each extend in the longitudinal directions of the sub-pixels so as to overlap multiple sub-pixels. Preferably, the third electrodes 34 are electrically connected to each other in the entire display region and can apply a common constant voltage or a certain alternating voltage to the sub-pixels. FIG. 1 shows an example where the third electrodes 34 each extend in the longitudinal directions of the sub-pixels (row direction of the liquid crystal panel) so as to overlap multiple sub-pixels.

Provided that the widthwise directions of each sub-pixel are defined as the left-right directions, as shown in FIG. 3, the third electrode 34 extends in the longitudinal directions of the sub-pixel at one of the right end and the left end of the sub-pixel. As shown in FIG. 1, in the liquid crystal display device according to the embodiment, each source line 2 extends in the longitudinal directions of each sub-pixel, and each gate line 1 extends in the widthwise directions of the sub-pixel. The right end and the left end of the sub-pixel respectively indicate the left outline and the left outline of the sub-pixel in the longitudinal directions. In the plan view shown in FIG. 1, the longitudinal outline of a source line 2 on the right of a sub-pixel corresponds to the right end of the sub-pixel, and the longitudinal outline of a source line 2 on the left of the sub-pixel corresponds to the left end of the sub-pixel. One of the widthwise directions of the sub-pixel corresponds to the right direction, and the other corresponds to the left direction. In FIG. 1, with the absorption axis 61A of the first polarizer 61 defined to be at 0°-180° azimuths, the right direction corresponds to the 0° azimuth and the left direction corresponds to the 180° azimuth. The outer peripheral shape of a sub-pixel depends on the arrangement of the gate lines 1 and the source lines 2. Accordingly, the outer peripheral shape may not be a rectangular shape as shown in FIG. 3.

With the third electrodes 34 disposed at one of the right end and the left end of the sub-pixels in a plan view, the contrast ratio can be improved on the side with the third electrodes 34. Specifically, with the third electrodes 34 disposed at the right end of the sub-pixels, in the first display mode, the contrast ratio is high in observation of the liquid crystal display device from the right direction while the contrast ratio is low in observation thereof from the left direction, whereby the privacy can be enhanced in observation from the left direction. With the third electrodes 34 disposed at the left end of the sub-pixels, in the first display mode, the contrast ratio is high in observation of the liquid crystal display device from the left direction while the contrast ratio is low in observation thereof from the right direction, whereby the privacy can be enhanced in observation from the right direction. Also, with the third electrode 34 disposed in part of each sub-pixel, not in the entire surface of each sub-pixel, in the later-described second display mode, unnecessary electric fields in the thickness direction of the liquid crystal layer are less likely to be generated, whereby the mode efficiency can be improved.

Each third electrode 34 extends in the longitudinal directions of each sub-pixel and may be disposed in any manner as long as an oblique electric field is formed between the third electrode 34 and the linear electrode portions 14a of the second electrode 14 and/or between the third electrode 34 and the first electrode 12 exposed through an opening between the linear electrode portions 14a. Thus, the extending directions of the third electrode 34 may not be parallel to the extending directions of each source line 2, i.e., the longitudinal outlines of each sub-pixel. The oblique electric field means an electric field generated in the thickness direction of the liquid crystal layer 20 and is preferably an oblique electric field extending in the extending directions of the linear electrode portions 14a. The whole part of each third electrode 34 may not be located inside one sub-pixel in the left-right directions of the sub-pixel. As shown in FIG. 1, the third electrode 34 may overlap a source line 2 in a plan view.

The ratio (α) of a width 34W of the third electrode 34 in a widthwise direction of the sub-pixel to a width 12W of the first electrode 12 in the widthwise direction of the sub-pixel shown in FIG. 3 is 0.14 or greater and 0.25 or smaller. With the third electrode 34 having a ratio α represented by the following formula (1) of 0.14 or greater and 0.25 or smaller, asymmetric viewing angle characteristics can be achieved in observation of the sub-pixel from the left-right directions in the later-described first display mode.

α=width of third electrode in widthwise direction of sub-pixel/width of first electrode in widthwise direction of sub-pixel (1)

A smaller width 34W of the third electrode 34 can generate a more oblique electric field in the thickness direction of the liquid crystal layer 20. However, a ratio α of smaller than 0.14 results in approximately symmetric viewing angle characteristics in observation of the sub-pixel from the left-right directions. Also, a ratio α of smaller than 0.14 only causes an approximately horizontal electric field even when voltage is applied to the third electrode 34, failing to achieve a narrow viewing angle mode. Meanwhile, a ratio α of greater than 0.25 allows the third electrode 34 to have a wider width 34W and thereby to increase the area overlapping the first electrode 12. Thus, a vertical electric field is generated in the thickness direction of the liquid crystal layer 20 to cause approximately symmetric viewing angle characteristics in observation of the sub-pixel from the left-right directions. When the third electrode 34 extends in the longitudinal directions of the sub-pixel in the center of the sub-pixel, the viewing angle characteristics is not asymmetric in observation of the sub-pixel from the left-right directions even when the ratio α satisfies the range of 0.14 or greater and 0.25 or smaller.

The width 12W of the first electrode 12 in the widthwise direction of the sub-pixel means the average value of the width at the upper end of the first electrode 12 and the width at the lower end of the first electrode in the widthwise direction. Provided that the shape of each third electrode 34 in a portion overlapping one sub-pixel in a plan view is referred to as the planar shape of the third electrode 34, the drawings including FIG. 3 show an example where the planar shape of the third electrode 34 is a rectangle. Alternatively, the third electrode 34 may have a planar shape such as a trapezoid or a triangle. The width 34W of the third electrode 34 in the widthwise direction of the sub-pixel means the average value of the width at the upper end of the third electrode 34 and the width at the lower end of the third electrode in the widthwise direction.

The third electrode 34 extends in an extending direction D2 that may form an angle of 0° to 5° with the absorption axis of a polarizer extending in the longitudinal directions of the sub-pixel or may be parallel to the absorption axis of a polarizer extending in the longitudinal directions of the sub-pixel. FIG. 3 shows an example where the extending directions D2 of the third electrode is parallel to the absorption axis 62A of the second polarizer 62. The extending direction D2 of the third electrode may form an angle of 0° to 5° with the extending directions D1 of the linear electrode portions 14a.

Preferably, as shown in FIG. 3, the third electrode 34 does not overlap the linear electrode portions 14a of the second electrode 14 in a plan view. In a region where the third electrode 34 does not overlap the linear electrode portions 14a, an obliquely vertical electric field, not a vertical electric field, can be formed in the liquid crystal layer 20. This is more preferred in order to provide asymmetric viewing angle characteristics.

In a plan view, the whole part of the third electrode 34 may be light-shielded by the black matrix 33 or part of the third electrode 34 may be exposed through the optical opening 40. When the third electrode 34 overlaps the linear electrode portions 14a of the second electrode 14 in the optical opening 40, the area where the third electrode 34 overlaps the linear electrode portions 14a in a plan view is preferably ⅕ or smaller, more preferably ¹/₁₀ or smaller, of the area of the optical opening 40.

The first electrodes 12, the second electrodes 14, and the third electrodes 34 may each be formed from, for example, a transparent conductive material such as indium tin oxide (ITO) or indium zinc oxide (IZO).

The liquid crystal layer 20 contains liquid crystal molecules 21. The liquid crystal molecules 21 preferably have a positive value for the anisotropy of dielectric constant (Δε) defined by the following formula (positive type). In addition, the liquid crystal molecules 21 are preferably homogeneously aligned in a no-voltage-applied state (with no voltage applied). The direction of the major axes of the liquid crystal molecules 21 with no voltage applied is also referred to as the initial alignment direction of the liquid crystal molecules.

Δε=(dielectric constant of liquid crystal molecules in major axis direction)−(dielectric constant of liquid crystal molecules in minor axis direction)  (L)

The expression "with no voltage applied" means the state in which a voltage equal to or higher than the threshold value of the liquid crystal molecules is not applied to the liquid crystal layer 20. Examples thereof include the state in which the same constant voltage is applied to all of the first electrodes 12, the second electrodes 14, and the third electrodes 34; and the state in which a constant voltage is applied to at least one group of the first electrodes 12, the second electrodes 14, or the third electrodes 14 and a voltage lower than the threshold value of the liquid crystal molecules is applied to the other group(s) thereof, relative to the constant voltage.

The liquid crystal layer 20 may have a thickness of 2 μm to 5 μm. A thinner liquid crystal layer 20 can provide a higher response time of the liquid crystal molecules 21. In terms of production, the thickness of the liquid crystal layer 20 is preferably 2.5 to 3.5 μm.

The liquid crystal layer 20 may have a retardation ($\Delta nd_1$) of 250 nm to 400 nm. The retardation ($\Delta nd_1$) is represented by the product of the birefringence index (Δn) of the liquid crystal material and the thickness ($d_1$) of the liquid crystal layer. In order to provide sufficient brightness, the retardation $\Delta nd_1$ is preferably 280 to 350 nm.

As shown in FIG. 2, the counter substrate 30 may include color filters 32 and the black matrix 33 between the second substrate 31 and the third electrodes 34. In a front view of the liquid crystal panel 100, the color filters 32 may be disposed for the respective sub-pixels so as to be superimposed with the optical openings 40 as shown in FIG. 1. The color filters 32 include red color filters 32R, green color filters 32G, and blue color filters 32B, for example. The color filters 32 of the same color may be repeatedly arranged in the row or column direction of the liquid crystal panel 100, for example. Even in such a case, the boundaries of the sub-pixels are shielded from light by the black matrix 33, and thus the color filters 32 seem to be disposed for the respective sub-pixels and to be superimposed with the optical openings 40 in a front view of the liquid crystal panel 100.

The black matrix 33 is not limited and may be a typical product used in the field of liquid crystal display devices. For example, a black matrix made of a black resin may be used. In a plan view, the black matrix 33 may be disposed around each optical opening 40 or may be disposed to define each optical opening 40.

As shown in FIG. 2, the counter substrate 30 preferably includes a dielectric layer (first dielectric layer 35) between the third electrodes 34 and the second alignment film 42. Presence of the first dielectric layer 35 can reduce or prevent generation of a vertical electric field that acts in the thickness direction of the liquid crystal layer 20 in the wide viewing angle mode in which no voltage is applied to the third electrodes 34. As a result, the liquid crystal display device of the embodiment functions as a transverse electric field mode liquid crystal display device that forms a fringe electric field corresponding to a fringe electric field formed by an FFS mode liquid crystal display device not having an electrode on a typical counter substrate side. Thus, the mode efficiency can be more improved than in a case without the first dielectric layer 35.

The dielectric constant e of the first dielectric layer 35 may be ε=3 to 4, for example. The first dielectric layer 35 has a thickness of preferably 0.5 μm or greater and 4 μm or smaller. With the first dielectric layer 35 having a thickness of greater than 4 µm, parallax confusion may be caused to possibly reduce the display quality. The first dielectric layer 35 may be a layer of a resin such as an acrylic resin or a polyimide resin, for example.

As shown in FIG. 2, the counter substrate 30 may include a second dielectric layer 36 between the color filters 32 and the third electrodes 34. The second dielectric layer 36 can flatten the surfaces of the color filters 32 and reduce or prevent occurrence of cracks in formation of the third electrodes 34. The second dielectric layer 36 may be a layer having similar features, such as the dielectric constant ε, the thickness, and the material, to the first dielectric layer 35.

The first alignment film 41 and the second alignment film 42 control the initial alignment azimuth of the liquid crystal molecules 21 with no voltage applied and the tilt angle (pre-tilt angle) of the liquid crystal molecules 21 with no voltage applied. In order to improve the viewing angle characteristics, the first alignment film 41 and the second alignment film 42 are each preferably an alignment film (horizontal alignment film) which aligns the liquid crystal molecules 21 parallel to a surface of the active matrix substrate 10 or a surface of the counter substrate 30. The expression "aligns parallel to" means that the tilt angle (including the pre-tilt angle) of the liquid crystal molecules 21 is 0° to 5°, preferably 0° to 3°, more preferably 0° to 1°, with respect to a reference surface. The tilt angle (including the pre-tilt angle) of the liquid crystal molecules 21 means the angle of the major axes of the liquid crystal molecules 21 with respect to a reference surface.

The difference between the inclination azimuth of the liquid crystal molecules 21 with respect to the surface of the active matrix substrate 10 and the inclination azimuth of the liquid crystal molecules 21 with respect to the surface of the counter substrate 30 is preferably 180°. Preferably, for example, the liquid crystal molecules 21 are raised from the 90° azimuth toward the 270° azimuth with respect to one of the surface of the active matrix substrate 10 and the surface of the counter substrate 30, and the liquid crystal molecules 21 are raised from the 270° azimuth toward the 90° azimuth with respect to the other substrate. For example, the first alignment film 41 formed on the surface of the active matrix substrate 10 and the second alignment film 42 formed on the surface of the counter substrate 30 are attached such that the directions of the alignment treatment on the two substrates are made opposite from each other (the difference between the directions is 180°). Thereby, the difference between the inclination azimuth of the liquid crystal molecules 21 with respect to the surface of the active matrix substrate 10 and the inclination azimuth of the liquid crystal molecules 21 with respect to the surface of the counter substrate 30 can be 180°.

The first alignment film 41 or the second alignment film 42 preferably has an anchoring energy of $1 \times 10^{-7}$ J/m$^2$ or smaller. An alignment film having an anchoring energy of $1 \times 10^{-7}$ J/m$^2$ or smaller is also referred to as a weak anchoring film, and an alignment film having an anchoring energy of greater than $1 \times 10^{-7}$ J/m$^2$ is also referred to as a strong anchoring film. The anchoring energies of the alignment films are values determined by a typical method such as a method using a rotating magnetic field.

The first alignment film 41 preferably has an anchoring energy of $1 \times 10^{-7}$ J/m$^2$ or smaller. Preferably, the first alignment film 41 is a weak anchoring film, and the second alignment film 42 is a strong anchoring film. As described in the above, the alignment azimuth of the liquid crystal molecules 21 in the liquid crystal layer 20 is changed by a fringe electric field formed between each first electrode 12 and each second electrode 14. Unfortunately, the liquid crystal molecules 21 located in a center portion of the linear electrode portions 14a and in a center portion of the opening 14b of the second electrode 14 are less likely to be influenced by the fringe electric field and are thus less likely to move. Use of an alignment film having an anchoring energy of $1 \times 10^{-7}$ J/m$^2$ or smaller as the first alignment film 41 disposed on the active matrix substrate 10 side allows a better move of liquid crystal molecules located in positions receiving a smaller influence of the fringe electric field (e.g., a center electrode portion of the second electrode 14 and a center portion between adjacent second electrodes 14). As a result, the transmittance of the sub-pixel is improved to achieve a high mode efficiency in the first display mode and in the second display mode. When the thickness $d_1$ of the liquid crystal layer 20 is reduced without changing the retardation Δn of the liquid crystal material, the response time of the liquid crystal molecules 21 is improved but the actual retardation of the liquid crystal layer 20 is shifted from an expected retardation (Δn·$d_1$) that has been estimated so as to achieve the maximum transmittance. Thereby, the mode efficiency may be reduced in the first display mode and in the second display mode. Fortunately, use of a weak anchoring alignment film as the first alignment film 41 can improve the mode efficiency in the first display mode and in the second display mode.

The first alignment film 41 has an anchoring energy of $1 \times 10^{-9}$ J/m$^2$ or greater and $1 \times 10^{-7}$ J/m$^2$ or smaller, for example. The second alignment film 42 has an anchoring energy of $1 \times 10^{-4}$ J/m$^2$ or greater and $1 \times 10^{-2}$ J/m$^2$ or smaller, for example. The difference between the anchoring energy of the first alignment film 41 and the anchoring energy of the second alignment film 42 is preferably $1 \times 10^{-3}$ J/m$^2$ or greater and $1 \times 10^{-7}$ J/m$^2$ or smaller.

The strong anchoring film may be a film of a polymer such as polyamic acid, polyimide, polyamide, or polysiloxane, for example. The strong anchoring film may have undergone an alignment treatment by rubbing or light irradiation. In the case of performing an alignment treatment by light irradiation, the strong anchoring film is preferably a photoalignment film. The photoalignment film contains a photo-functional group such as an azobenzene group, a chalcone group, a cinnamate group, a coumarin group, a tolan group, a stilbene group, or a cyclobutane ring. The photo-functional group is a functional group that causes a change in its structure, such as dimerization (formation of dimers), isomerization, photo Fries rearrangement, or decomposition (cleavage) upon irradiation with light such as ultraviolet light or visible light (electromagnetic waves, preferably polarized light, more preferably polarized ultraviolet light, particularly preferably linearly polarized ultraviolet light), to exert alignment controlling force to liquid crystal molecules.

The weak anchoring film can be formed from a polymer brush that is formed by living radical polymerization. Such a polymer brush can be formed by, for example, immersing a substrate such as the first substrate 11 or the second substrate 31 in a radically polymerizable monomer-containing liquid and proceeding with living radical polymerization of the radically polymerizable monomer on a surface of the substrate.

Examples of the polymer of the radically polymerizable monomer include phenyl methacrylate (PhMA), polymethyl methacrylate (PMMA), and polystyrene (PS).

Figure 4:
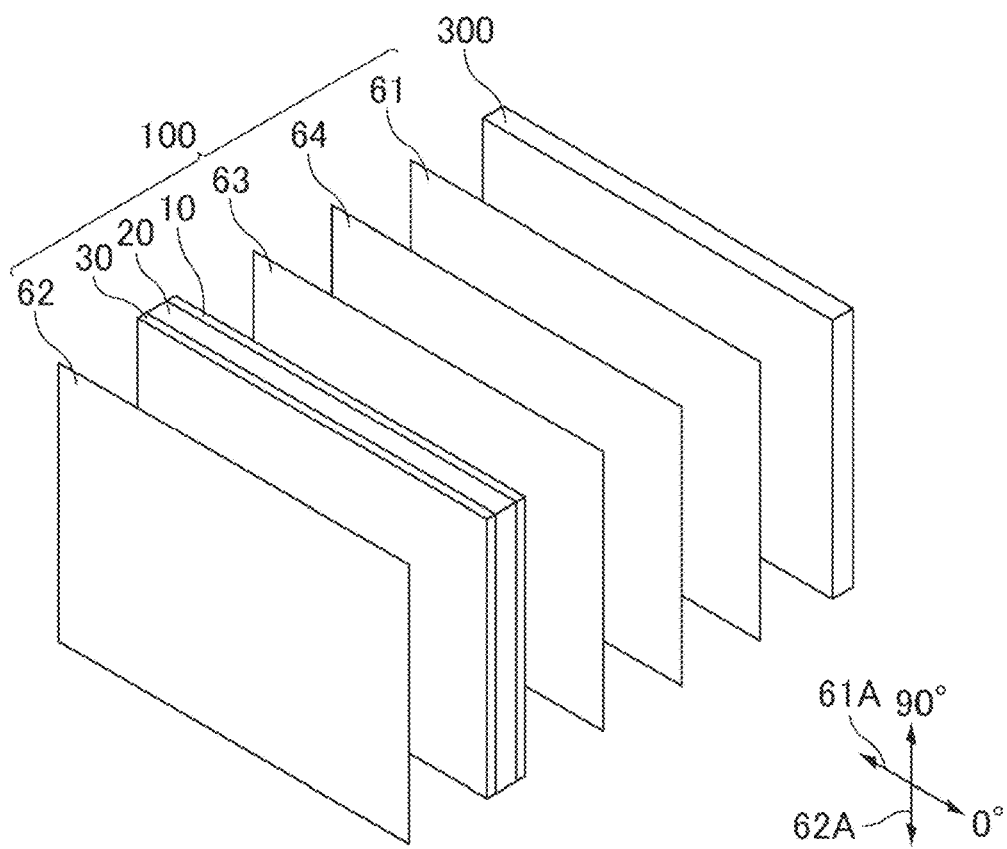
FIG. 4 is an exploded perspective view of the exemplary liquid crystal display device according to the embodiment.

Preferably, the liquid crystal panel 100 is further provided with the first polarizer 61 on the active matrix substrate 10 side, the second polarizer 62 on the counter substrate 30 side, and a retardation film between the active matrix substrate 10 and the first polarizer 61. Examples of the retardation film include a positive A plate and a positive C plate. FIG. 4 is an exploded perspective view of an exemplary liquid crystal display device according to the embodiment. When the backlight 300 is disposed on the back surface of the liquid crystal panel 100, as shown in FIG. 4, the second polarizer 62, the liquid crystal panel 100, a positive C plate 63, a positive A plate 64, the first polarizer 61, and the backlight 300 may be disposed in the stated order.

An example of the positive A plate is a λ/4 plate. The λ/4 plate may be any plate that exerts an in-plane retardation of a ¼ wavelength (110 to 170 nm) to at least light having a wavelength of 550 nm. The in-plane retardation and the retardation in the thickness direction each herein mean the retardation of a film to light having a wavelength of 550 nm, unless otherwise noted. An in-plane retardation Re can be calculated according to the formula: $Re=(nx-ny)\times d_2$, wherein $d_2$ represents the thickness (nm) of the film. A retardation Rth in the thickness direction can be calculated according to the formula: $Rth=(nx-nz)\times d_2$. In the formulas, "nx" represents the refractive index in a direction providing the maximum in-plane refractive index (i.e., slow axis direction), "ny" represents the refractive index in a direction perpendicular to the in-plane slow axis, and "nz" represents the refractive index in the thickness direction.

As shown in FIG. 4, the liquid crystal display device according to the embodiment preferably includes the backlight 300 disposed on the back surface side (active matrix substrate side) of the liquid crystal panel 100. The backlight 300 is preferably a directional backlight that provides different luminance distributions between the right side and the left side of the backlight depending on the polar angle in observation of the liquid crystal display device.

Figure 5:
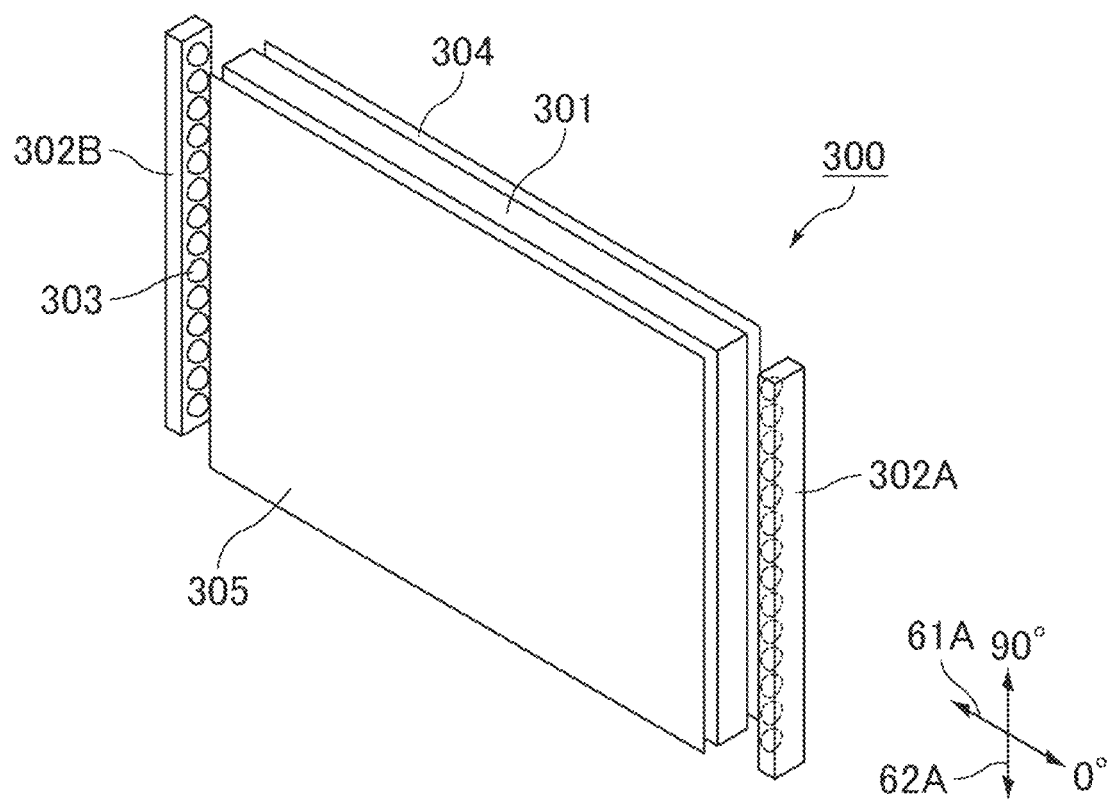
FIG. 5 is an exploded perspective view showing an exemplary structure of a backlight.

FIG. 5 is an exploded perspective view showing an exemplary structure of a backlight. The backlight 300 is an edge-lit backlight. As shown in FIG. 5, the backlight 300 preferably includes a light guide plate 301, two light sources 302A and 302B disposed on the respective side surfaces of the light guide plate 301, a reflector 304 on the back surface of the light guide plate 301, and an optical film 305 between the light guide plate 301 and the liquid crystal panel 100.

The light guide plate 301 is disposed such that the left-right directions of the light guide plate correspond to the widthwise directions of each sub-pixel of the liquid crystal panel 100. The light sources 302A and 302B are disposed on the right side surface and the left side surface of the light guide plate 301, respectively. Light emitted from the light source 302A on the right side of the light guide plate 301 toward the light guide plate 301 propagates from the right side to the left side of the light guide plate 301 to be emitted from the left side of the light guide plate 301 toward the liquid crystal panel 100. Light emitted from the light source 302B on the left side of the light guide plate 301 toward the light guide plate 301 propagates from the left side to the right side of the light guide plate 301 to be emitted from the right side of the light guide plate 301 toward the liquid crystal panel 100. The light sources 302A and 302B may each include light emitting diodes (LEDs) 303 or the like.

The reflector 304 may be any product that can reflect light, which is emitted from the light guide plate 301 to the back surface side, toward the light guide plate 301. Examples thereof include reflection films such as an enhanced specular reflector (ESR) film (available from 3M Ltd.).

The optical film 305 is preferably an optical film (3D film) providing different luminances according to the viewing angle range in the front view of the liquid crystal panel. The 3D film has on its surface thereof convex portions such as prisms, for example, and thereby controls the angle of light emitted from the backlight toward the liquid crystal panel. The 3D film thus can allow light incident from the light sources on the light guide plate to be emitted in a certain viewing angle range. The 3D film may be the 3D film disclosed in "The Society for Information Display" (U.S., 2010, Volume 10, Issue 1, Pages 218-221).

Figure 6:
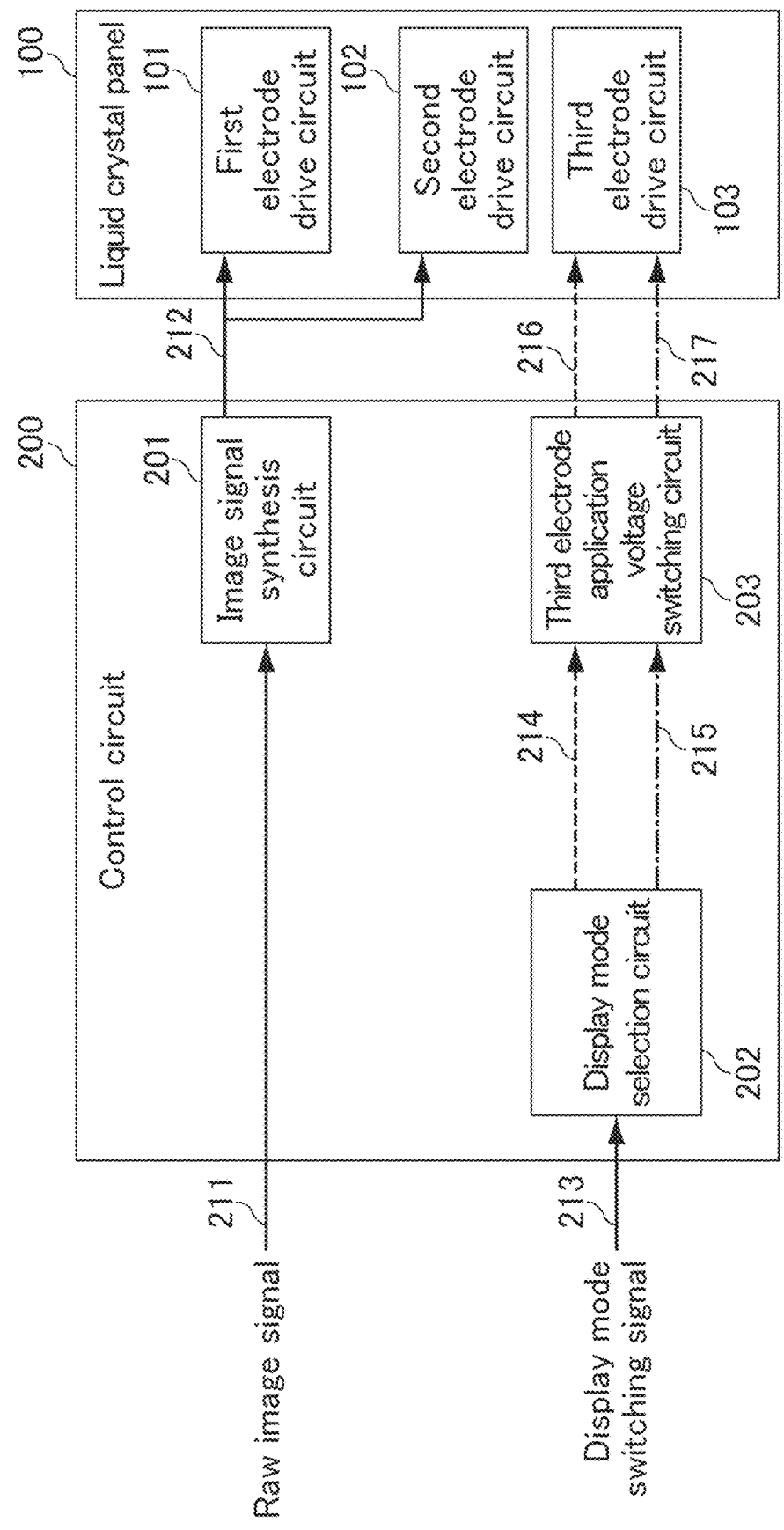
FIG. 6 is a block diagram schematically showing display methods for a first display mode, a second display mode, and a third display mode.

Hereinafter, a method for switching display modes is described with reference to FIG. 6 to FIG. 11. FIG. 6 is a block diagram schematically showing display methods for the first display mode, the second display mode, and the third display mode. As shown in FIG. 6, the liquid crystal display device according to the embodiment includes the liquid crystal panel 100 and a control circuit 200. The liquid crystal panel 100 may include a first electrode drive circuit 101 that applies voltage to the first electrodes 12, a second electrode drive circuit 102 that applies voltage to the second electrodes 14, and a third electrode drive circuit 103 that applies voltage to the third electrodes 34. The control circuit 200 may include an image signal synthesis circuit 201, a display mode selection circuit 202, and a third electrode application voltage switching circuit 203. In FIG. 6, the first electrode drive circuit 101, the second electrode drive circuit 102, and the third electrode drive circuit 103 are included in the liquid crystal panel 100. Alternatively, they may be included in the control circuit 200.

As shown in FIG. 6, the image signal synthesis circuit 201, for example, receives a raw image signal 211 for displaying a desired image and outputs an image signal 212 corresponding to the received raw image signal 211 to the first electrode drive circuit 101 and the second electrode drive circuit 102.

The control circuit 200 may switch between a first display mode that allows a first image to be observable in a narrow viewing angle range including the direction normal to the liquid crystal panel 100 (such a mode is also referred to as a narrow viewing angle mode) and a second display mode that allows the first image to be observable in a wide viewing angle range including the narrow viewing angle range (such a mode is also referred to as a wide viewing angle mode).

In the narrow viewing angle range, the contrast ratio is preferably lower than 2 when the liquid crystal panel is observed at a certain or greater polar angle from an oblique direction (azimuth angle of 45°, 135°, 225°, or 315°). The polar angle is herein expressed according to the definition in which the direction vertical to the surface of the liquid crystal panel is defined as a polar angle of 0° and the direction parallel to the surface of the panel as a polar angle of 90°. The polar angle that allows the contrast ratio to be lower than 2 is preferably 60° or greater, more preferably 45° or greater, still more preferably 30° or greater, for example. In other words, the narrow viewing angle mode is preferably a mode that allows the contrast ratio to be lower than 2 at at least one azimuth selected from the azimuth angles 0°, 45°, 90°, 135°, 180°, 225°, 270°, or 315° in a polar angle range excepting 0° (from the front), i.e., a polar angle of 60° or greater, more preferably 45° or greater, still more preferably 30° or greater. In the narrow viewing angle mode, the contrast ratio at a polar angle of 0° (from front) is preferably 10 or greater, more preferably 20 or greater.

The wide viewing angle range means a range having a polar angle greater than that in the narrow viewing angle range. The wide viewing angle mode is preferably a mode that allows the contrast ratio to be 2 or greater, more preferably 10 or greater, at at least two azimuths selected from the azimuth angles 45°, 135°, 225°, or 315° in a polar angle range of 60° or greater and smaller than 90°.

The control circuit 200 switches between application of an alternating voltage and application of a constant voltage to the third electrodes 34. Controlling the voltage applied to the third electrodes 34 can switch between the first display mode (narrow viewing angle mode) and the second display mode (wide viewing angle mode). For example, as shown in FIG. 6, the third electrode application voltage switching circuit 203 inputs an alternating signal 216 or a constant voltage signal 217 to the third electrode drive circuit 103 according to the received display mode selection signal so as to switch between application of an alternating voltage and application of a constant voltage to the third electrodes 34.

The constant voltage is a reference voltage for driving the liquid crystal display device. For example, a certain voltage may be applied to the first electrodes 12 or the second electrodes 14, or the first electrodes 12 or the second electrodes 14 may be grounded. In the case where the constant voltage is applied to the third electrodes 34, the third electrodes 34 may be electrically connected to the first electrodes 12 or the second electrodes 14; the constant voltage common to the first electrodes 12 or the second electrodes 14 may be applied to the third electrodes 34 through signal lines different from the first electrodes 12 or the second electrodes 14; or the third electrodes 34 may be grounded.

In the first display mode, the control circuit 200 preferably applies an alternating voltage to the third electrodes 34. The display mode selection circuit 202 receives a display mode switching signal 213 for switching between the first display mode and the second display mode. When the first display mode is selected, as shown in FIG. 6, the display mode selection circuit 202 outputs a first display mode selection signal 214 to the third electrode application voltage switching circuit 203. When receiving the first display mode selection signal 214 from the display mode selection circuit 202, the third electrode application voltage switching circuit 203 outputs the alternating signal 216 to the third electrode drive circuit 103, whereby a certain alternating voltage is applied to the third electrodes 34.

In the case of providing black display in the narrow viewing angle mode, for example, the control circuit 200 applies a common voltage to the second electrodes 14 and the first electrodes 12 while applying an alternating voltage to the third electrodes 34. For example, black display can be provided by applying a common voltage to the first electrodes 12 and the second electrodes 14 while applying to the third electrodes 34 an alternating voltage of 4 V relative to the common voltage.

Figure 7:
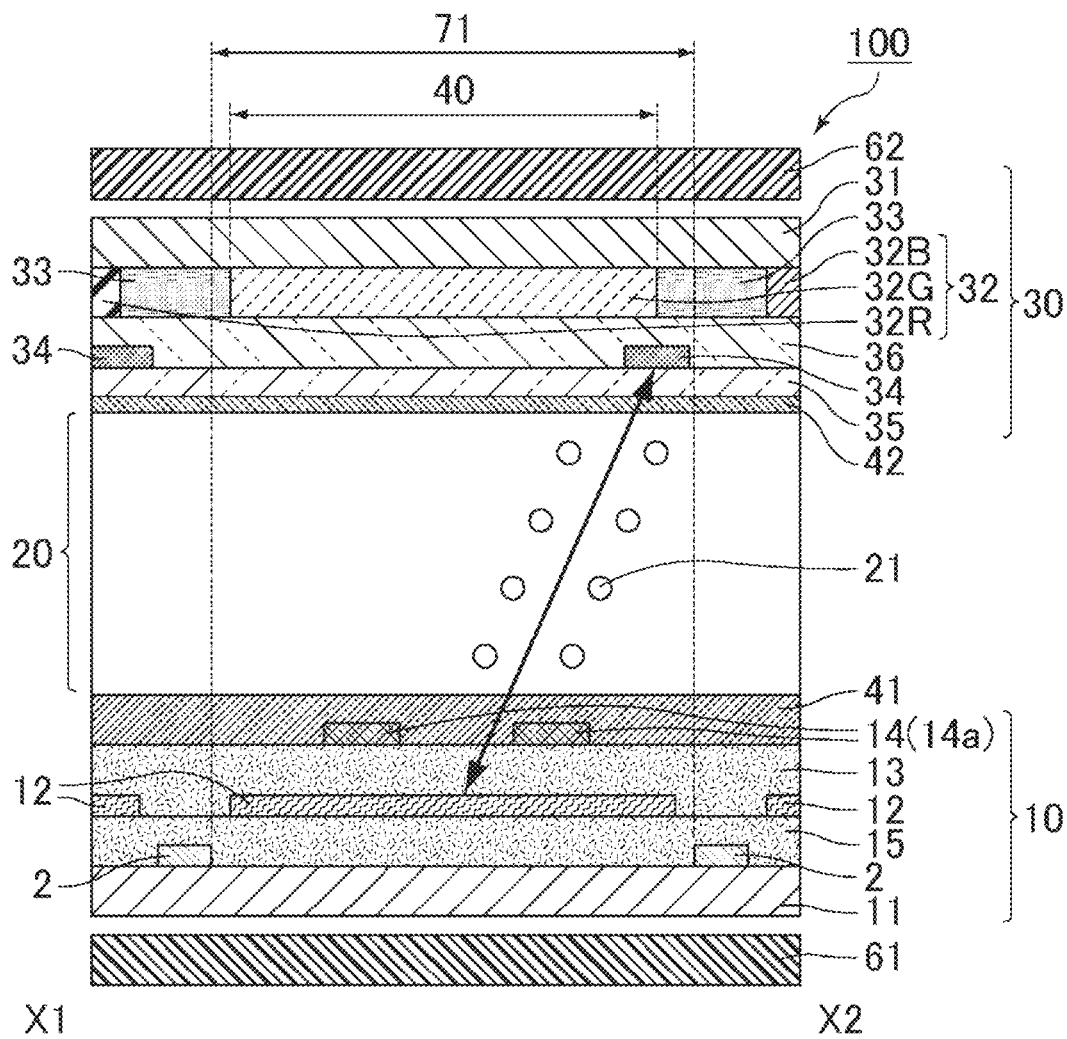
FIG. 7 is a schematic cross-sectional view of one sub-pixel in black display in a narrow viewing angle mode.

FIG. 7 is a schematic cross-sectional view of one sub-pixel in black display in the narrow viewing angle mode. As shown in FIG. 7, an oblique electric field is formed between the first electrode 12 and the third electrode 34 in the thickness direction of the liquid crystal layer 20. Thus, the tilt angle of the liquid crystal molecules 21 with respect to the active matrix substrate 10 and the counter substrate 30 is greater than the pre-tilt angle with no voltage applied.

Figure 8:
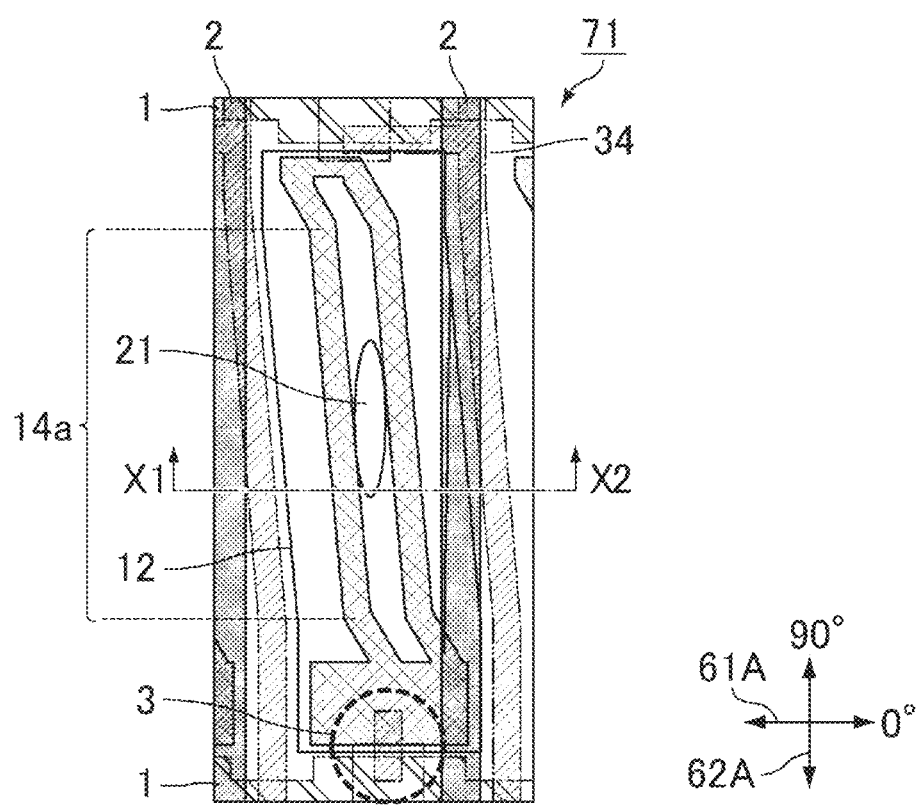
FIG. 8 is a schematic plan view of one sub-pixel in black display in the narrow viewing angle mode.

FIG. 8 is a schematic plan view of one sub-pixel in black display in the narrow viewing angle mode. In FIG. 8 and the later-described FIG. 10, the black matrix and the color filters are not shown. With the alignment azimuth of the liquid crystal molecules 21 set to be parallel to the absorption axis 61A of the first polarizer 61 or the absorption axis 62A of the second polarizer 62 in a plan view, black display is provided without light from the back surface of the liquid crystal panel passing through the liquid crystal layer 20. FIG. 8 shows an example in which the alignment azimuth of the liquid crystal molecules 21 is parallel to the absorption axis 62A of the second polarizer 62. The term "black display" means a display state with a minimum luminance (grayscale of 0).

In the case of providing grayscale display in the narrow viewing angle mode, for example, the control circuit 200 applies a common voltage to one group of the first electrodes 12 and the second electrodes 14 and applies to the other a voltage having a different value from the common voltage while applying an alternating voltage to the third electrodes 34. For example, a common voltage is applied to the second electrodes 14 and the alternating voltage applied to the first electrodes is adjusted from 0 V to 4 V relative to the common voltage while to the third electrodes 34 are applied an alternating voltage of 4 V relative to the common voltage, whereby grayscale display from black display to white display can be provided. Described here is the case where grayscale display is provided by applying a common voltage to the second electrodes 14 and applying a certain alternating voltage to the first electrodes 12. Alternatively, grayscale display can be provided by applying a common voltage to the first electrodes 12 and applying a certain alternating voltage to the second electrodes 14. The term "white display" means a display state with a maximum luminance (grayscale of 255).

Figure 9:
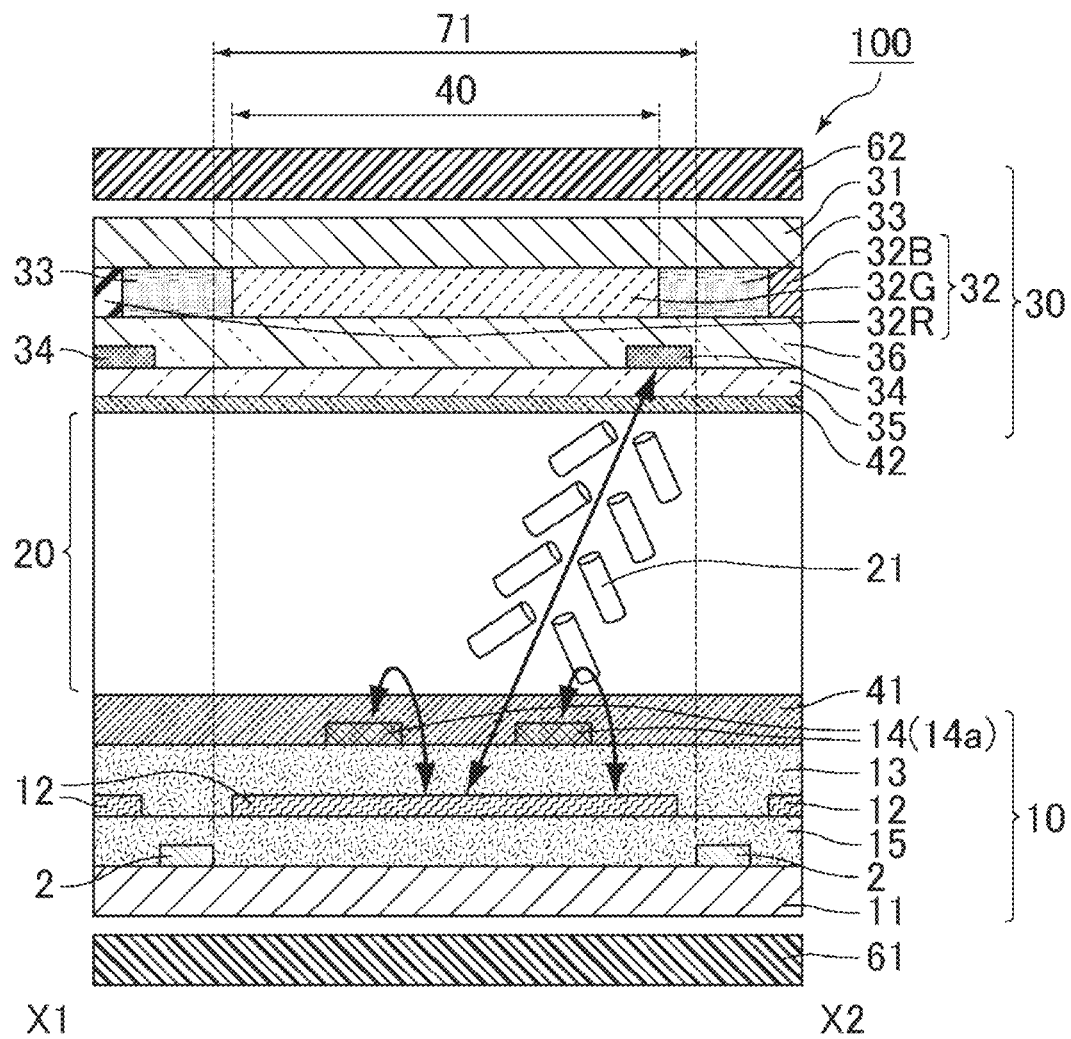
FIG. 9 is a schematic cross-sectional view of one sub-pixel in white display in the narrow viewing angle mode.

FIG. 9 is a schematic cross-sectional view of one sub-pixel in white display in the narrow viewing angle mode. As shown in FIG. 9, a fringe electric field is formed between the first electrode 12 and the second electrode 14, and an oblique electric field is formed in the thickness direction of the liquid crystal layer 20 between the third electrode 34 and the first electrode 12. As a result, an electric field is synthesized from the fringe electric field and the oblique electric field between the third electrode 34 and the set of the first electrode 12 and the second electrode 14, so that the liquid crystal molecules 21 align at a different azimuth while forming an angle with respect to the active matrix substrate 10.

Figure 10:
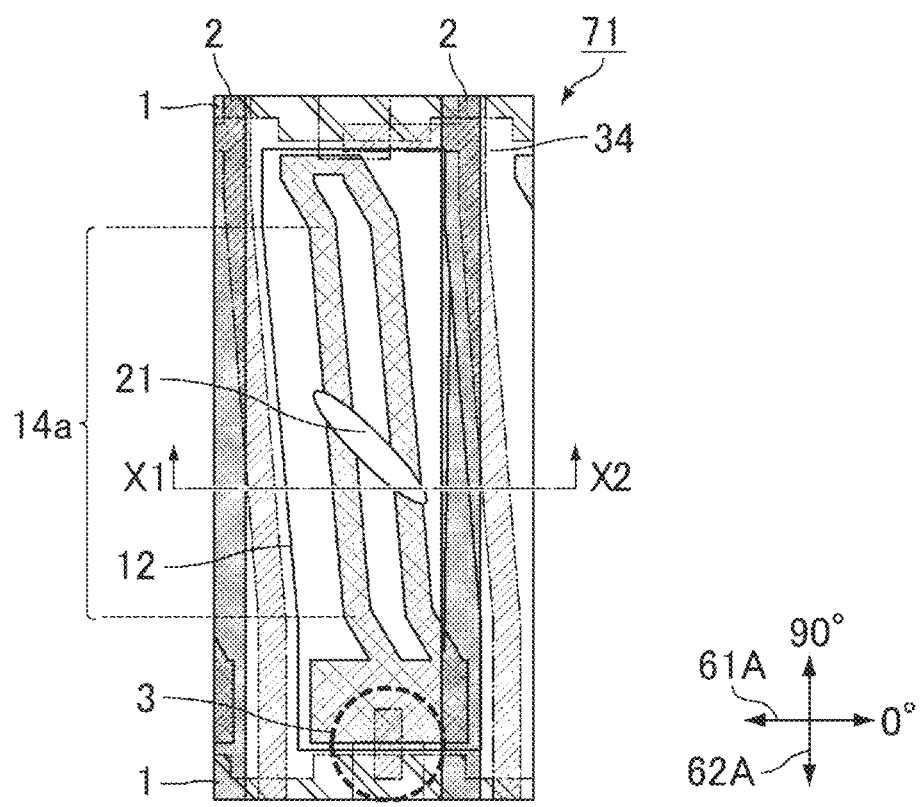
FIG. 10 is a schematic plan view of one sub-pixel in white display in the narrow viewing angle mode.

FIG. 10 is a schematic plan view of one sub-pixel in white display in the narrow viewing angle mode. The fringe electric field formed between the first electrode 12 and the second electrode 14 rotates the liquid crystal molecules 21 in the plane of the liquid crystal layer 20 and thereby changes the alignment azimuth of the liquid crystal molecules 21 from the initial alignment azimuth as shown in FIG. 10. As a result, the major axis direction of the liquid crystal molecules 21 forms angles with the absorption axis 61A of the first polarizer and the absorption axis 62A of the second polarizer, whereby light emitted from the back surface of the liquid crystal panel is passed through. Here, the liquid crystal molecules 21 form a greater angle with respect to the active matrix substrate 10 than in the case of providing grayscale display in the later described wide viewing angle mode. The first image is thus observable in the narrow viewing angle range, while the first image can be less observable in the wide viewing angle range due to a change caused to the image, such as an extremely reduced contrast ratio.

The liquid crystal display device according to the embodiment, when used as a vehicle-mounted display, is preferably disposed such that the widthwise directions of each sub-pixel of the liquid crystal panel 100 correspond to the width directions of the vehicle. Such a configuration allows the first image to be observable from one of the front passenger's seat side and the driver's seat side while to be less observable from the other side in the first display mode. For example, when the front passenger's seat side is located on the right side of the vehicle and the third electrodes 34 are disposed on the right side of the sub-pixels, the contrast ratio is high in observation of the liquid crystal panel 100 from the front passenger's seat side. In contrast, the contrast ratio is low in observation of the liquid crystal panel 100 from the driver's seat side to provide a white-tinged image on the display screen, whereby the first image can be less observable. However, the color of a vehicle-mounted display should match the color of the interior of the vehicle, and thus such a white-tinged image on the display screen is not preferred for aesthetic purposes. Then, the present inventors found that use of a directional backlight as the backlight 300 can reduce the occurrence of white-tinged images in the first display mode by darkening the display screen while increasing the privacy in observation from a certain direction.

The light sources 302A and 302B of the backlight 300 may be turned on and off by the control circuit 200. In the first display mode, when the third electrodes 34 are disposed at the right end of the sub-pixels, the control circuit 200 preferably turns on the light source 302B on the left side surface of the light guide plate 301, of the two light sources 302A and 302B of the backlight 300. In the first display mode, when the third electrodes 34 are disposed at the left end of the sub-pixels, the control circuit 200 preferably turns on the light source 302A on the right side surface of the light guide plate 301, of the two light sources 302A and 302B. In the first display mode, the liquid crystal panel 100 provides a higher contrast ratio in the display region on the side with the third electrodes 34. Thus, in the first display mode, the light source on a side of the sub-pixels opposite to the side with the third electrodes 34 is turned on, whereby backlight illumination can be emitted toward a region with a higher contrast ratio of the liquid crystal panel.

In the second display mode, the control circuit 200 preferably applies to the third electrodes 34 the constant voltage common to the first electrodes 12 or the second electrodes 14. When the second display mode is selected, as shown in FIG. 6, the display mode selection circuit 202 outputs a second display mode selection signal 215 to the third electrode application voltage switching circuit 203. When receiving the second display mode selection signal 215 from the display mode selection circuit 202, the third electrode application voltage switching circuit 203 outputs the constant voltage signal 217 to the third electrode drive circuit 103 so as to apply to the third electrodes 34 the constant voltage common to the first electrodes 12 or the second electrodes 14.

In the case of providing black display in the wide viewing angle mode, for example, the control circuit 200 executes an operation of applying a common voltage to the second electrode 14 and the first electrode 12 and also applying to the third electrode 34 the constant voltage common to the first electrode or the second electrode 14. FIG. 2 is also a schematic cross-sectional view of one sub-pixel in black display in the wide viewing angle mode. As shown in FIG. 2, since no electric field is generated in the liquid crystal layer 20, the liquid crystal molecules 21 are aligned at the initial alignment azimuth. With no voltage applied to the liquid crystal layer 20, the liquid crystal molecules 21 are preferably aligned parallel to the surface of the active matrix substrate 10 and the surface of the counter substrate 30. The alignment azimuth in a plan view of the liquid crystal molecules in black display in the wide viewing angle mode is similar to that shown in FIG. 8 and thus is not described.

Figure 11:
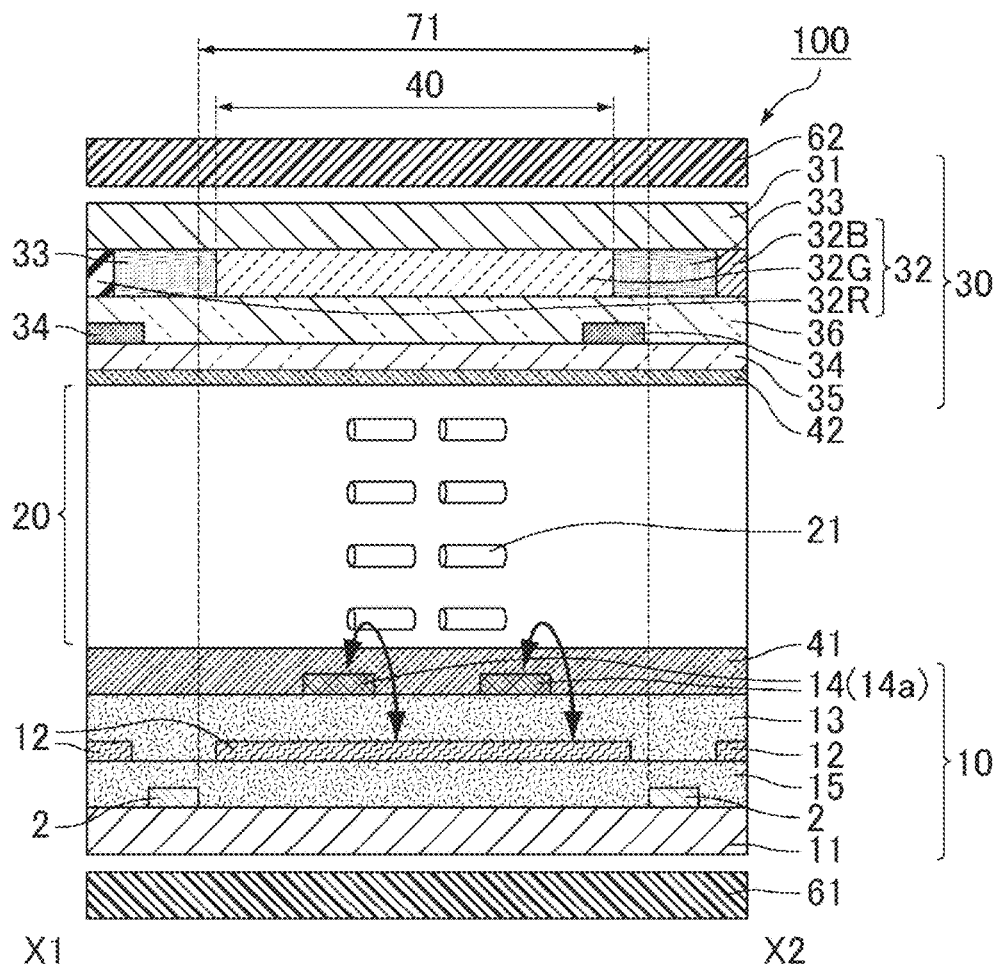
FIG. 11 is a schematic cross-sectional view of one sub-pixel in white display in a wide viewing angle mode.

In providing grayscale display in the wide viewing angle mode, the control circuit 200, for example, applies a common voltage to one of the first electrode 12 and the second electrode 14 and applies a voltage different from the common voltage to the other while applying to the third electrode 34 the constant voltage common to the first electrode 12 or the second electrode 14. For example, when a common voltage is applied to the second electrode 14, the alternating voltage applied to the first electrode 12 is adjusted to 0 to 4 V relative to the common voltage while a constant voltage (0 V) common to the common voltage is applied to the third electrode 34, whereby grayscale display from black display to white display can be provided. Described here is the case in which grayscale display is provided by applying a common voltage to the second electrode 14 and applying a certain alternating voltage to the first electrode 12. Alternatively, grayscale display can be provided by applying a common voltage to the first electrode 12 and applying a certain alternating voltage to the second electrode 14. FIG. 11 is a schematic cross-sectional view of one sub-pixel in white display in the wide viewing angle mode. As shown in FIG. 11, no electric field is formed in the thickness direction of the liquid crystal layer 20, and a fringe electric field is formed between the first electrode 12 and the second electrode 14. The alignment azimuth in a plan view of the liquid crystal molecules in white display in the wide viewing angle mode is similar to that shown in FIG. 9 and thus is not described.

In the second display mode, the control circuit 200 preferably turns on both of the two light sources 302A and 302B of the backlight 300. In the second display mode, the contrast ratio of the liquid crystal panel 100 has no particular difference between the right side and the left side of the display region. Thus, both of the light sources 302A and 302B are preferably turned on so that backlight illumination is emitted toward the entire surface of the liquid crystal panel 100.

The control circuit 200 inputs different image signals to the first sub-pixel 70 and the second sub-pixel 71 such that a second image different from the first image is observed in the wide viewing angle range. Such a display method is also referred to as the veil-view function. The second image is preferably a veil-view pattern.

Better viewing angle characteristics can be achieved by outputting a veil-view pattern (including a dummy pattern) that provides controlled luminances and chromaticities for the respective grayscale values such that the veil-view pattern is unobservable from one of the right direction, the left direction, and oblique directions of the liquid crystal panel 100, in which the contrast ratio is high, while the veil-view pattern is observable at the other azimuths.

Display using the veil-view function can enhance the privacy in combination with either the first display mode or the second display mode. Still, combination with the first display mode can further enhance the privacy.

With the counter substrate 30 provided with the third electrodes 34, a weak vertical electric field is formed between the third electrodes 34 and the first electrodes 12 even when a common voltage is applied to the third electrodes 34. The weak vertical electric field formed in the thickness direction of the liquid crystal layer 20 slightly increases the tilt angle of the liquid crystal molecules 21 with respect to the active matrix substrate 10 and the counter substrate 30 as compared with the tilt angle with no voltage applied. Providing grayscale display by applying a certain alternating voltage to the first electrodes 12 or the second electrodes 14 while slightly raising the liquid crystal molecules 21 can cause a significant difference in luminance between an odd-number row side sub-pixel (first sub-pixel 70) and an even-number row side sub-pixel (second sub-pixel 71) in observation from not only the oblique directions but also the left-right directions. Thereby, γ curves with sufficient contrast ratios of odd-number row side sub-pixel/even-number row side sub-pixel can be obtained. Accordingly, the veil-view pattern is perceivable in observation of the display screen of the liquid crystal panel not only from the oblique directions but also from the left-right directions. When a certain alternating voltage is applied to the third electrodes 34, the tilt angle of the liquid crystal molecules 21 is further increased to achieve better privacy.

Hereinafter, an exemplary method for displaying an image using the veil-view function is described with reference to FIG. 12 to FIG. 17. FIGS. 12, 13, 15 and 16 schematically show the first sub-pixel 70 and the second sub-pixel 71 shown in the drawings including FIG. 1.

Figure 12:
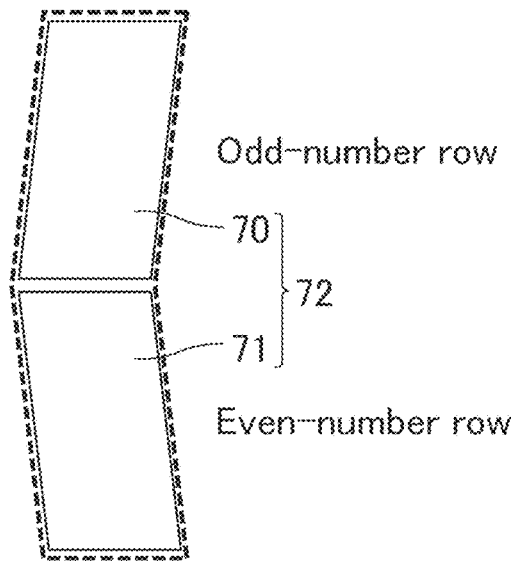
FIG. 12 is a schematic plan view of an exemplary display unit in a liquid crystal panel.
Figure 13:
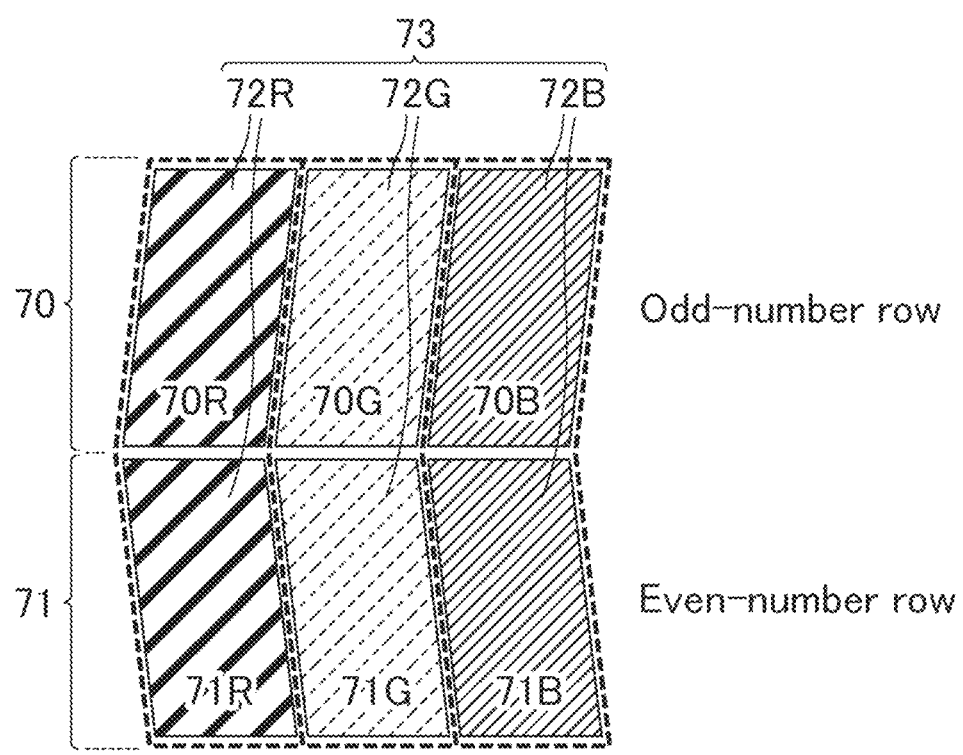
FIG. 13 is a schematic plan view of an exemplary color element for color display using a veil-view function.

FIG. 12 is a schematic plan view of an exemplary display unit in a liquid crystal panel. FIG. 13 is a schematic plan view of an exemplary color element for color display using the veil-view function. The liquid crystal panel 100 preferably includes display units 72 for displaying an image using the veil-view function. As shown in FIG. 12, the display units 72 each include among the sub-pixels a pair of sub-pixels arranged adjacent to each other, one of the sub-pixels being a first sub-pixel 70 selected from odd-number rows and the other being a second sub-pixel 71 selected from even-number rows. As shown in FIG. 1, the extending directions of the linear electrode portions 14a may be different between the second electrode 14 disposed in the first sub-pixel 70 and the second electrode 14 disposed in the second sub-pixel 71, and may be axisymmetric with respect to a gate line 1.

As shown in FIG. 13, for color display, the liquid crystal panel 100 preferably includes a red display unit 72R including a first red sub-pixel 70R and a second red sub-pixel 71R, a green display unit 72G including a first green sub-pixel 70G and a second green sub-pixel 71G, and a blue display unit 72B including a first blue sub-pixel 70B and a second blue sub-pixel 71B. The first red sub-pixel 70R and the second red sub-pixel 71R are each superimposed with a red color filter 32R in an optical opening. The first green sub-pixel 70G and the second green sub-pixel 71G are each superimposed with a green color filter 32G in an optical opening. The first blue sub-pixel 70B and the second blue sub-pixel 71B are each superimposed with a blue color filter 32B in an optical opening.

The first sub-pixel 70 and the second sub-pixel 71 may each be considered as one sub-pixel as shown in FIG. 1, or a combination of a first red sub-pixel 70R, a first green sub-pixel 70G, and a first blue sub-pixel 70B may be regarded as the first pixel 70 and a combination of a second red sub-pixel 71R, a second green sub-pixel 71G, and a second blue sub-pixel 71B may be regarded as the second pixel 71 as shown in FIG. 13. For color display by a normal display method that provides a raw image alone, the pixels including red, green, and blue pixels are independently driven. In the normal color display for providing a raw image alone, the display can be provided at a resolution twice that of the color display using the veil-view function. In order to achieve a wider viewing angle, a raw image may be displayed without providing display using a veil-view function in the second display mode (wide viewing angle mode).

An image can be displayed using the veil-view function by, for example, dividing the luminance data value of the raw image desired to be displayed as a first image, Data 1, into two equivalent data values Data 2 and Data 3, inputting the data value of Data 1+Data 2 to the first sub-pixel 70 or the second sub-pixel 71, and inputting the data value of Data 1−Data 3 to the other. When the liquid crystal panel is observed from the normal direction, for example, the luminance of the first sub-pixel 70 and the luminance of the second sub-pixel 71 are spatially averaged to be recognized as the luminance of the raw image. Meanwhile, when the liquid crystal panel is observed at a certain polar angle, the luminances are recognized as the luminance Data 1+Data 2 or the luminance Data 1−Data 3. Thereby, the raw image is perceived from the normal direction of the liquid crystal panel, while an image different from the raw image is perceivable in observation in a certain polar angle range.

The image, which is displayed using the veil-view function and is different from the raw image, is also referred to as a veil-view pattern. The veil-view pattern is a display image that is to be superimposed with the first image to make the first image less perceivable. Displaying the veil-view pattern further enhances the privacy. The polar angle range that allows a veil-view pattern to be perceivable may be the same as or different from the wide viewing angle range. The polar angle range that allows the veil-view pattern to be perceivable is not limited and may be, for example, 45° or greater, with a direction vertical to the surface of the liquid crystal panel defined as a polar angle of 0° and a direction parallel to the surface of the liquid crystal panel defined as a polar angle of 90°. The polar angle range that allows the veil-view pattern to be perceivable may be more preferably 30° or greater, still more preferably 20° or greater. The density (perception) of the veil-view pattern can be adjusted by adjusting the luminance levels of the first sub-pixel 70 and the second sub-pixel 71. Controlling the density of the veil-view pattern can appropriately set the polar angle range that allows the veil-view pattern to be perceivable.

Figure 14:
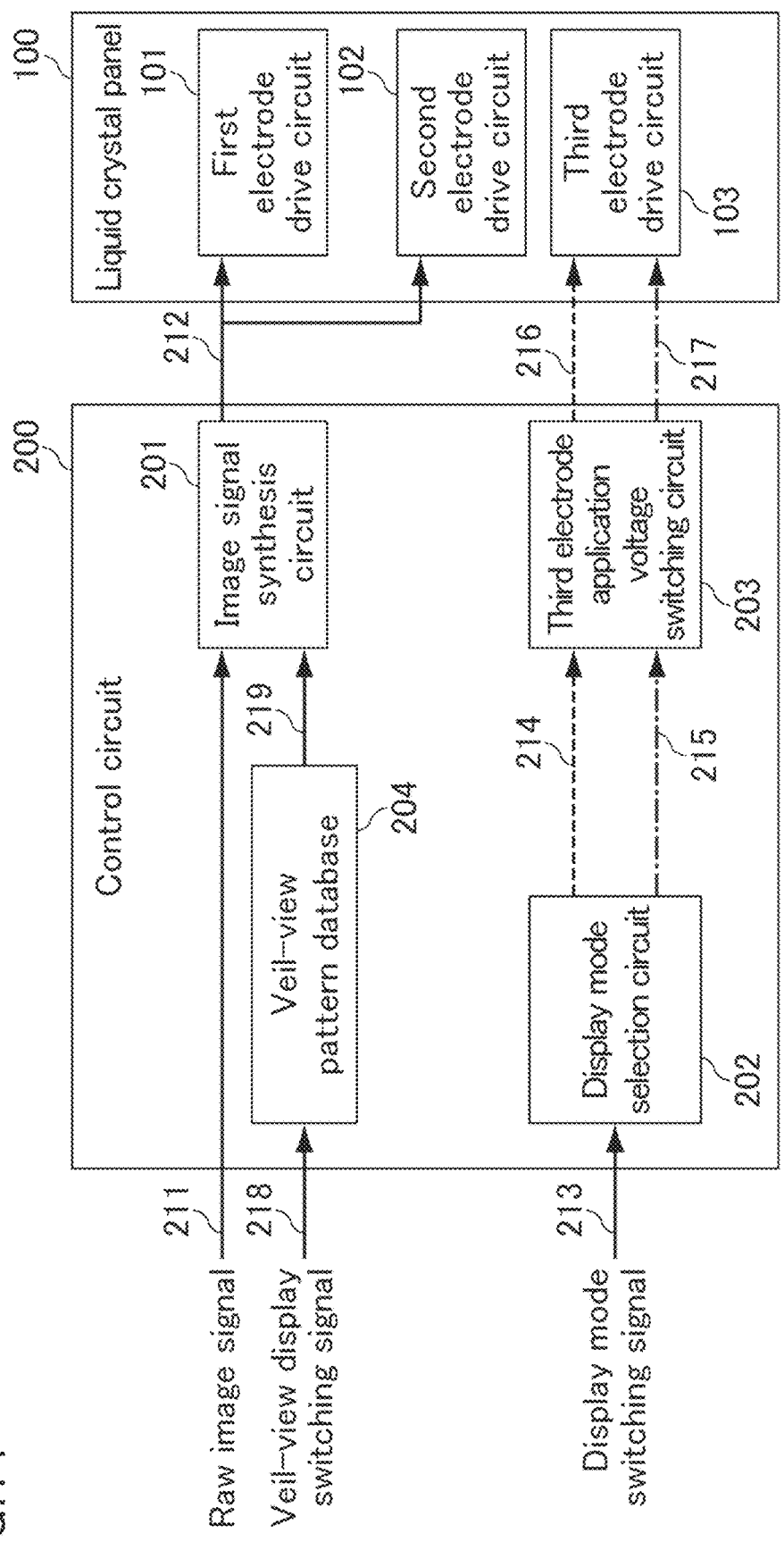
FIG. 14 is a block diagram schematically showing a method for displaying a veil-view pattern.

Hereinafter, a method for displaying a veil-view pattern is described with reference to FIG. 14. FIG. 14 is a block diagram schematically showing a method for displaying a veil-view pattern. As shown in FIG. 14, the control circuit 200 may further include a database 204 in which information related to the veil-view patterns is stored. When receiving a veil-view display switching signal 218, the database 204 outputs a veil-view pattern image signal 219 to the image signal synthesis circuit 201. The image signal synthesis circuit 201 outputs an image signal 212 formed by synthesis of the raw image signal 211 and the veil-view pattern image signal 219 to the first electrode drive circuit 101 and the second electrode drive circuit 102. When the first display mode selection signal 214 is input from the display mode selection circuit 202, the database 204 may output the veil-view pattern image signal 219 to the image signal synthesis circuit 201.

For example, when the second electrode drive circuit 102 applies a common voltage to the second electrodes 14, the first electrode drive circuit 101 applies different magnitudes of voltage to the first electrodes 12 corresponding to the first sub-pixel 70 and the second sub-pixel 71 such that the veil-view pattern is observed. When the first electrode drive circuit 101 applies a constant voltage to the first electrodes 12, the second electrode drive circuit 102 applies different magnitudes of voltage to the second electrodes 14 corresponding to the first sub-pixel 70 and the second sub-pixel 71 such that the veil-view pattern is observed.

Figure 15:
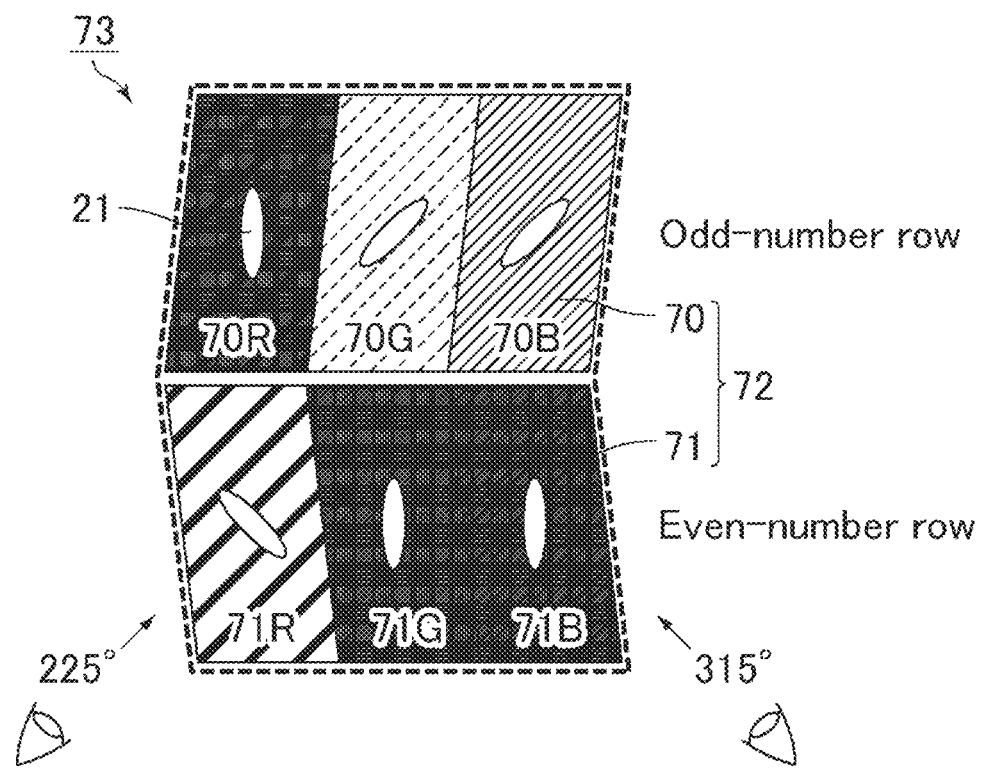
FIG. 15 is a schematic plan view of an exemplary display pattern for a color element.
Figure 16:
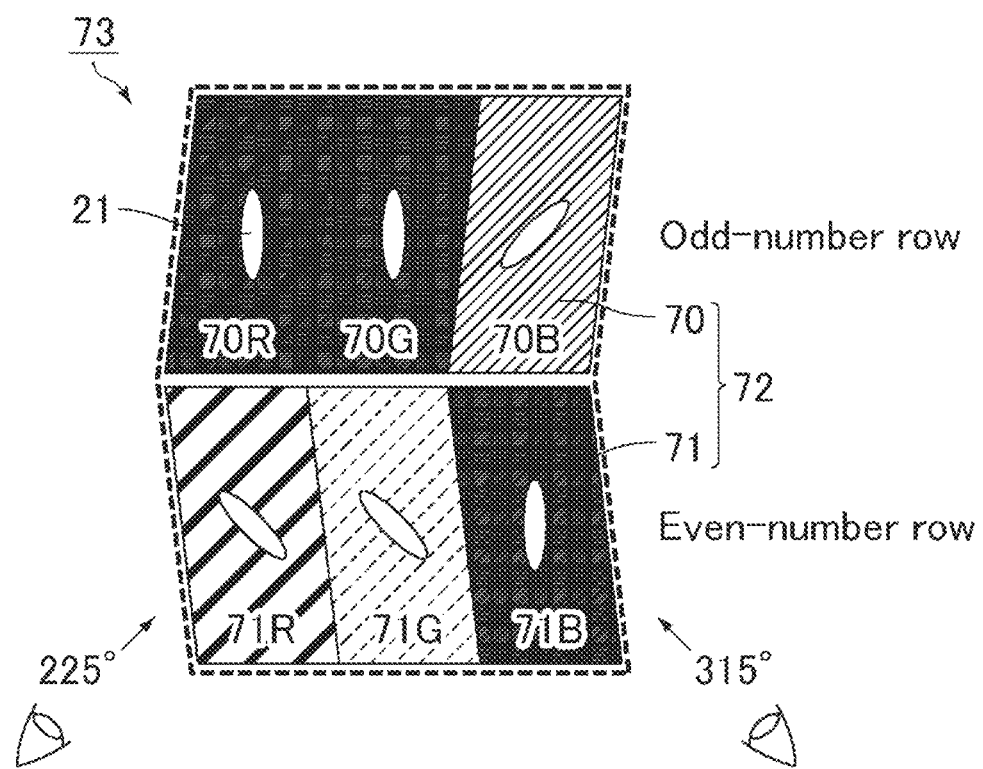
FIG. 16 is a schematic plan view of another exemplary display pattern for a color element.

FIG. 15 is a schematic plan view of an exemplary display pattern for a color element. FIG. 16 is a schematic plan view of another exemplary display pattern for a color element. A row in which the first sub-pixels 70 are arranged is also referred to as an odd-number row. A row in which the second sub-pixels 71 are arranged is also referred to as an even-number row. As shown in FIG. 15, when the first red sub-pixel 70R, the second green sub-pixel 71G, and the second blue sub-pixel 71B are in black display and the second red sub-pixel 71R, the first green sub-pixel 70G, and the first blue sub-pixel 70B are in white display, the liquid crystal molecules present in the second red sub-pixel 71R in observation at an azimuth of 225° are observed from the direction of the minor axes of the liquid crystal molecules in which the retardation is high, and thus a red color is observed. In contrast, the liquid crystal molecules in the first green sub-pixel 70G and the first blue sub-pixel 70B are observed from the direction of the major axes of the liquid crystal molecules in which the retardation is low, so that the corresponding colors are not observed. As a result, the red color is perceived. Meanwhile, in observation at an azimuth of 315°, the liquid crystal molecules in the first green sub-pixel 70G and the first blue sub-pixel 70B are observed from the direction of the minor axes of the liquid crystal molecules, so that a cyan color, which is a mixture of blue and green colors, is perceived. Here, the liquid crystal molecules in the second red sub-pixel 71R are observed from the direction of the major axes of the liquid crystal molecules, so that the corresponding color is not observed. As a result, the cyan color is perceived. As shown in FIG. 16, when the first red sub-pixel 70R, the first green sub-pixel 70G, and the second blue sub-pixel 71B are in black display and the second red sub-pixel 71R, the second green sub-pixel 71G, and the first blue sub-pixel 70B are in white display, observation at an azimuth of 225° results in perception of a yellow color, which is a mixture of red and green colors, and observation at an azimuth of 315° results in perception of a blue color.

Figure 17:
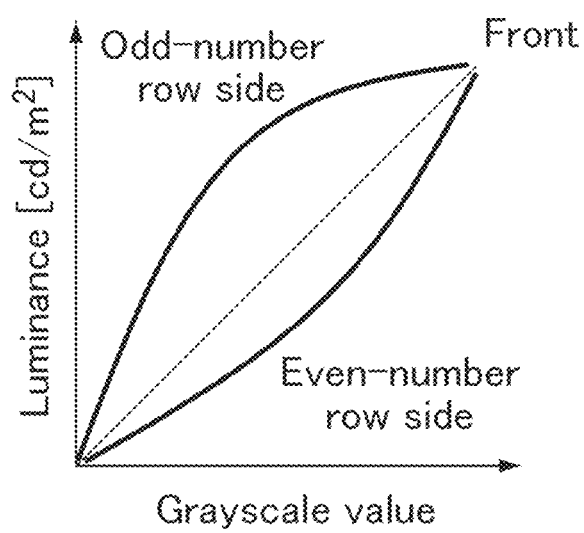
FIG. 17 shows an example of γ curves of a liquid crystal panel.

When the display pattern of the color elements shown in FIG. 15 and the display pattern of the color elements shown in FIG. 16 are combined, observation from the direction normal to the liquid crystal panel (from the front) results in observation of white display. FIG. 17 shows an example of y curves of a liquid crystal panel. As shown in FIG. 17, in the range of intermediate values in observation from a certain direction, the luminance is different between sub-pixels on the odd-number row side and sub-pixels on the even-number row side, whereby the contrast ratio of an image provided by the sub-pixels on the odd-number row side is significantly different from that of an image provided by the sub-pixels on the even-number row side. A veil-view pattern is preferably formed in such an intermediate value range in which a sufficient difference in perception (contrast ratio) between the odd-number row side sub-pixel and even-number row side sub-pixel can be achieved.

Figure 19:
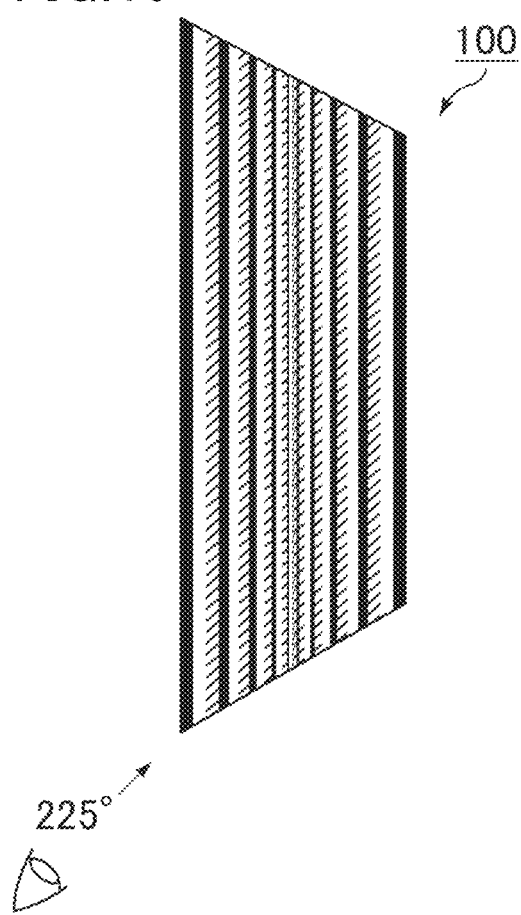
FIG. 19 is a schematic view of the display screen of the liquid crystal panel observed at an azimuth of 225°.
Figure 20:
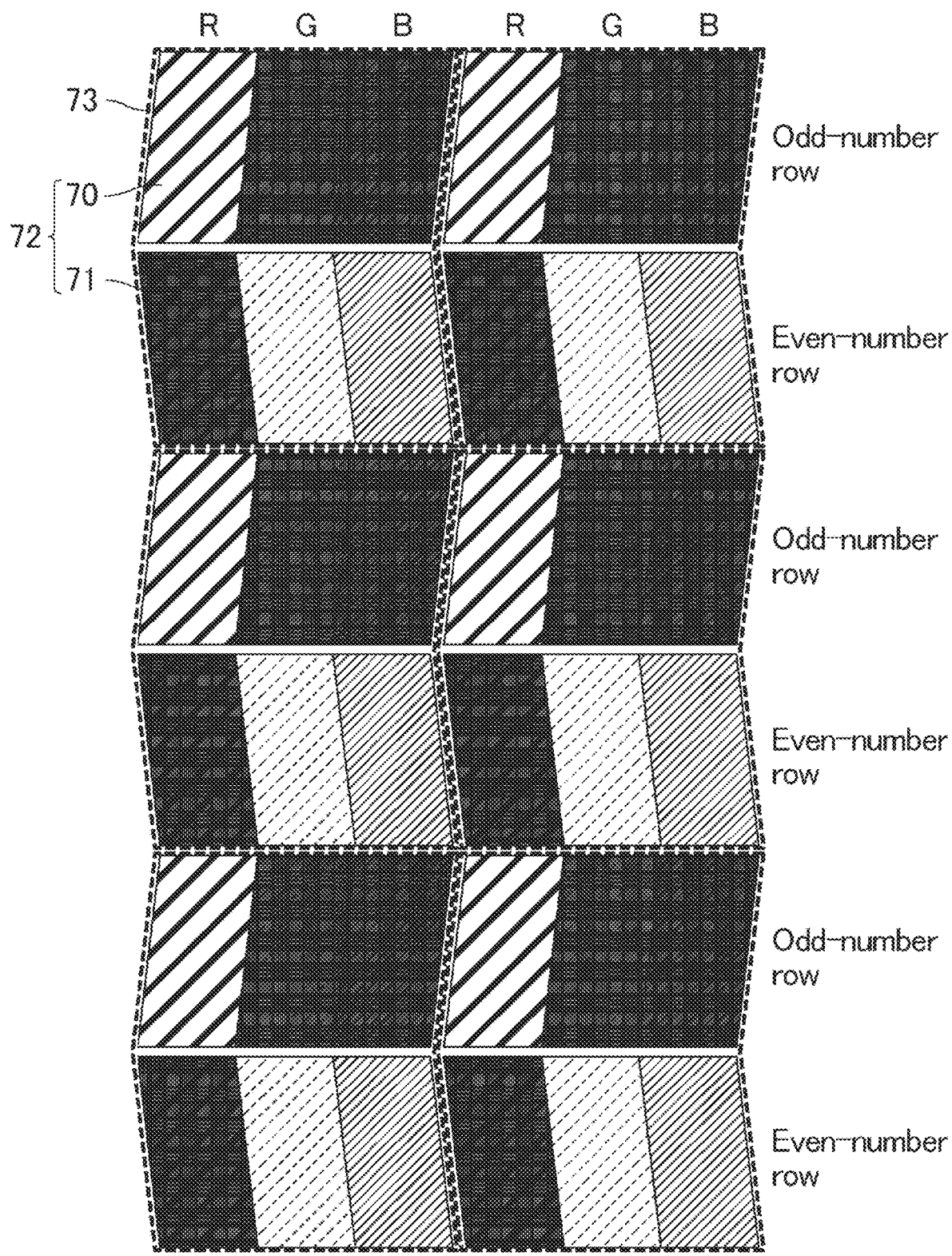
FIG. 20 is a schematic plan view of the liquid crystal panel, showing arrangement of color elements in a portion for displaying cyan stripes shown in FIG. 19.
Figure 21:
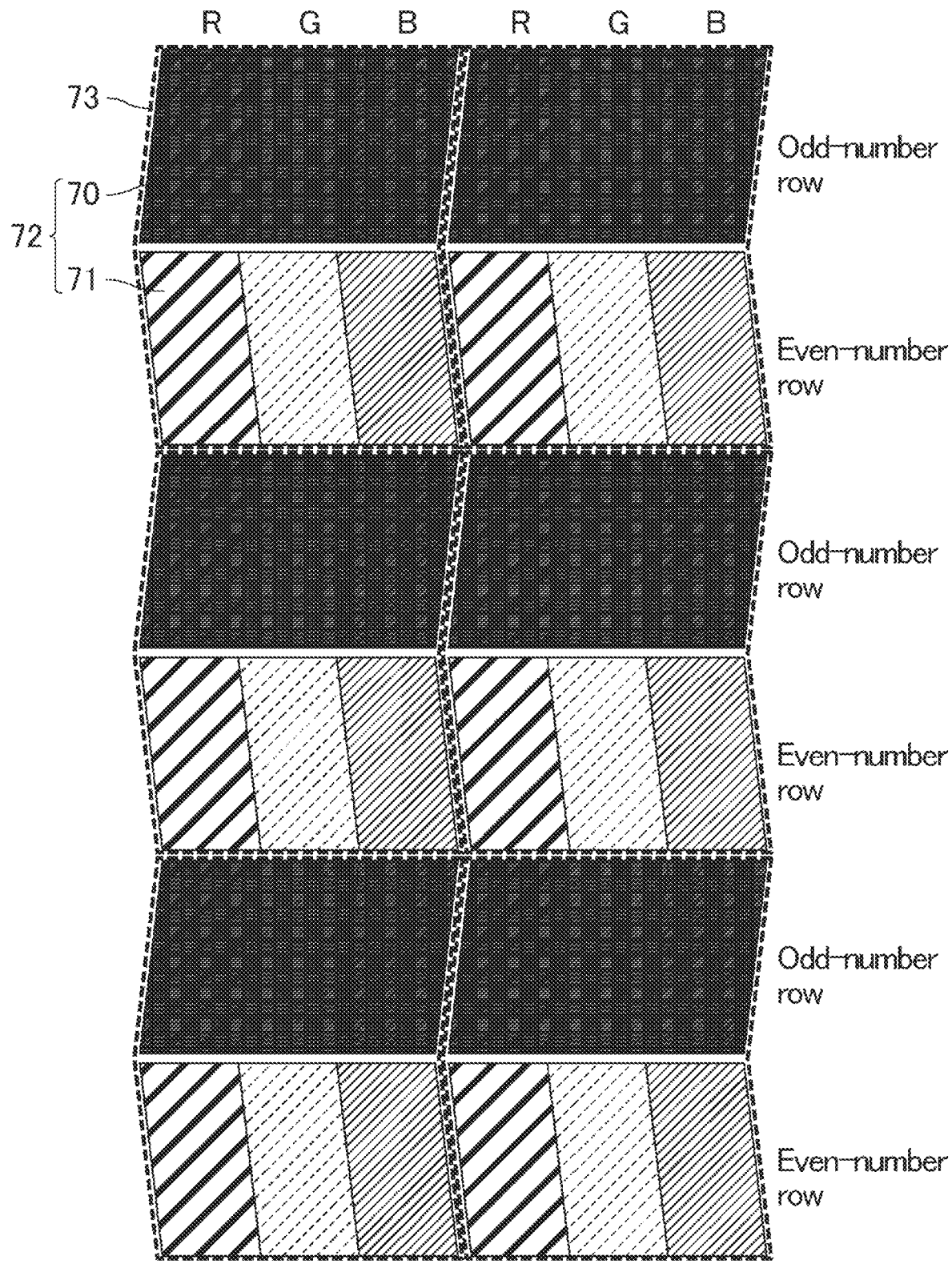
FIG. 21 is a schematic plan view of the liquid crystal panel, showing arrangement of color elements in a portion for displaying white stripes shown in FIG. 19.
Figure 22:
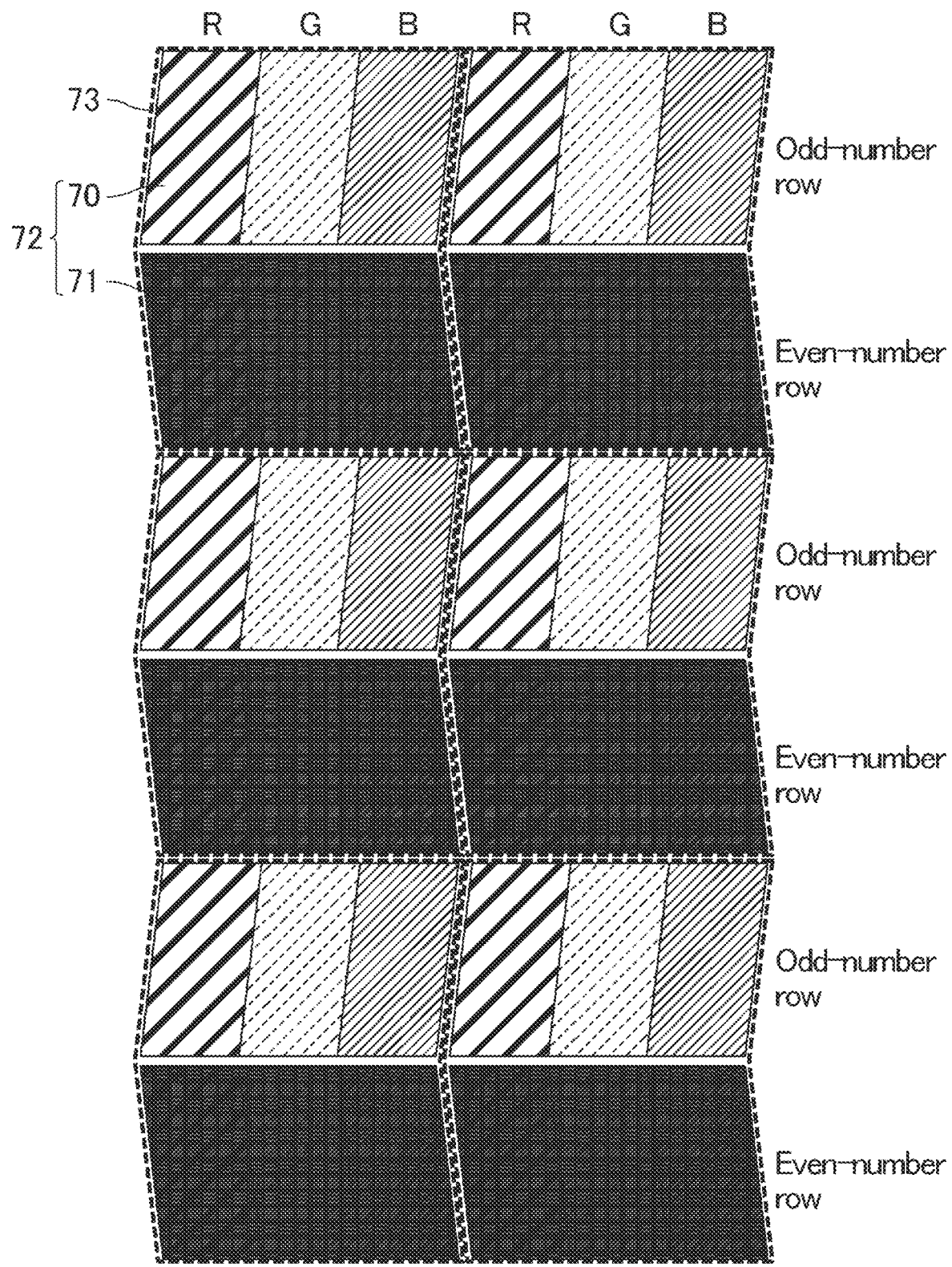
FIG. 22 is a schematic plan view of the liquid crystal panel showing arrangement of color elements in a portion for displaying black stripes shown in FIG. 19.

The veil-view pattern is not limited, and may be a geometric pattern such as a striped pattern or a checkered pattern, characters, or an image. The following describes a case of displaying stripes as the veil-view pattern with reference to FIG. 18 to FIG. 22. FIG. 20 to FIG. 22 schematically show the first sub-pixel 70 and the second sub-pixel 71 shown in the drawings including FIG. 1.

Figure 18:
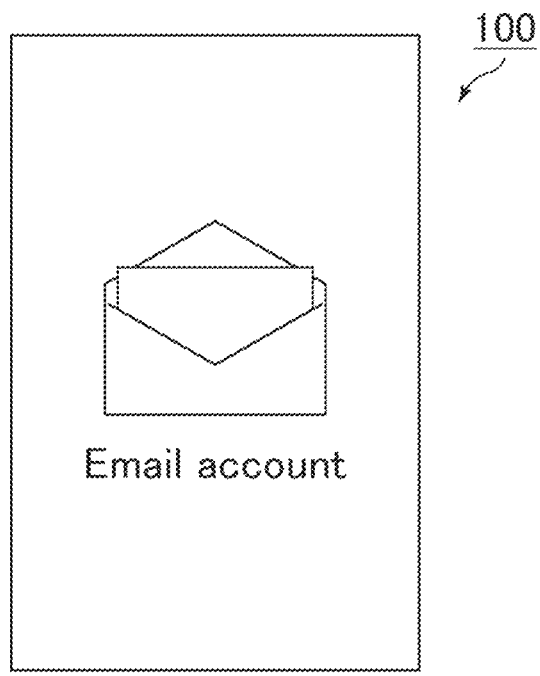
FIG. 18 is a schematic view of a display screen of a liquid crystal panel observed from the normal direction.

FIG. 18 is a schematic view of a display screen of a liquid crystal panel observed from the normal direction. FIG. 19 is a schematic view of the display screen of the liquid crystal panel observed at an azimuth of 225°. When the display screen of the liquid crystal panel is observed from the normal direction, an envelope image and the characters "Email account" are perceived as the first image as shown in FIG. 18. When the display screen of the liquid crystal panel is observed at an azimuth of 225°, a striped pattern as shown in FIG. 19 is perceived as the veil-view pattern on the first image. This makes the first image less perceivable from oblique directions, enhancing the privacy. The striped pattern is perceived as, for example, stripes of cyan, white, and black in observation at an azimuth of 225° and stripes of red, black, and white in observation at an azimuth of 315°.

FIG. 20 is a schematic plan view of the liquid crystal panel showing arrangement of color elements in a portion for displaying cyan stripes shown in FIG. 19. As shown in FIG. 20, color elements 73 are arranged in the row and column directions of the liquid crystal panel, with the first red sub-pixels 70R, the second green sub-pixels 71G, and the second blue sub-pixels 71B providing normal display and the second red sub-pixels 71R, the first green sub-pixels 70G, and the first blue sub-pixels 70B providing black display. With this arrangement, the liquid crystal display device can display cyan stripes in observation at an azimuth of 225° and red stripes in observation at an azimuth of 315°, as the veil-view patterns. The normal display is display for the first image.

FIG. 21 is a schematic plan view of the liquid crystal panel showing arrangement of color elements in a portion for displaying white stripes shown in FIG. 19. For white stripes, as shown in FIG. 21, the color elements 73 are arranged in the row and column directions of the liquid crystal panel, with the first red sub-pixels 70R, the first green sub-pixels 70G, and the first blue sub-pixels 70B providing black display and the second red sub-pixels 71R, the second green sub-pixels 71G, and the second blue sub-pixels 71B providing normal display. With this arrangement, the liquid crystal display device can display white stripes in observation at an azimuth of 225° and black stripes in observation at an azimuth of 315°.

FIG. 22 is a schematic plan view of the liquid crystal panel showing arrangement of color elements in a portion for displaying black stripes shown in FIG. 19. For black stripes, as shown in FIG. 22, the color elements 73 are arranged in the row and column directions of the liquid crystal panel, with the first red sub-pixels 70R, the first green sub-pixels 70G, and the first blue sub-pixels 70B providing normal display and the second red sub-pixels 71R, the second green sub-pixels 71G, and the second blue sub-pixels 71B providing black display. With this arrangement, the liquid crystal display device can display black stripes in observation at an azimuth of 225° and white stripes in observation at an azimuth of 315°.

Hereinafter, the effects of the present invention are described based on examples and comparative examples. The examples, however, are not intended to limit the scope of the present invention.

Example 1

In Example 1, simulation was made using a simulation software program (an LCD master 3D, available from Shintec Co., Ltd.). A liquid crystal display device according to Example 1 has the structure shown in FIG. 1 to FIG. 3. FIG. 1 to FIG. 3 are each also a schematic view of the liquid crystal display device according to Example 1. The liquid crystal display device according to Example 1 sequentially includes the first polarizer 61, the active matrix substrate 10, the first alignment film 41, the liquid crystal layer 20, the second alignment film 42, the counter substrate 30, and the second polarizer 62. The absorption axis 61A of the first polarizer 61 and the absorption axis 62A of the second polarizer 62 were made perpendicular to each other. A backlight was disposed on the back surface (second polarizer 62) side of the liquid crystal panel 100.

The active matrix substrate 10 sequentially includes the first substrate 11, the first electrodes 12, a silicon nitride film as the first insulating layer 13, and the second electrodes 14. One sub-pixel had a size of 60.55 μm in length and 20.2 μm in width. As shown in FIG. 3, each first electrode 12 was a solid electrode disposed for each sub-pixel. The first electrode 12 had a width 12W of 20.2 μm in the widthwise direction of the sub-pixel. The first electrode 12 had a thickness of 100 nm. Each second electrode 14 was disposed for each sub-pixel and included the linear electrode portions 14a. The width $L_{14}$ of one linear electrode portion 14a was 2.5 μm. The distance $S_{14}$ between adjacent linear electrode portions 14a was 3 μm. The second electrode 14 had a thickness of 100 nm. The first electrodes 12 and the second electrodes 14 were each formed from ITO.

The liquid crystal layer 20 contained the liquid crystal molecules 21 having a positive anisotropy of dielectric constant ($\Delta\varepsilon$=0.10) and had a thickness d: of 3.3 μm. The retardation and: of the liquid crystal layer 20 was 330 nm. The first alignment film 41 and the second alignment film 42 used were subjected to a horizontal alignment treatment for aligning the liquid crystal molecules homogeneously parallel to the surface of the active matrix substrate 10 and the surface of the counter substrate 30. The first alignment film 41 and the second alignment film 42 used were each a strong anchoring film having an anchoring energy of $1\times10^{-3}$ J/m².

The counter substrate 30 sequentially includes the second substrate 31, the color filters 32 and the black matrix 33, a resin layer as the second dielectric layer 36, the third electrodes 34, and a 2.5-μm-thick resin layer as the first dielectric layer 35 (overcoat layer). Each third electrode 34 extended in the longitudinal directions of one sub-pixel at the right end of the sub-pixel as shown in FIG. 3. Each third electrode 34 had a width 34W of 2.9 μm in the widthwise direction of each sub-pixel and a thickness of 100 nm. The third electrodes 34 were formed from ITO.

The backlight used was a typical backlight that provides bilaterally symmetric luminance viewing angles and does not cause luminance change at any polar angle in observation of the liquid crystal panel.

Comparative Example 1

Figures 23, 24:
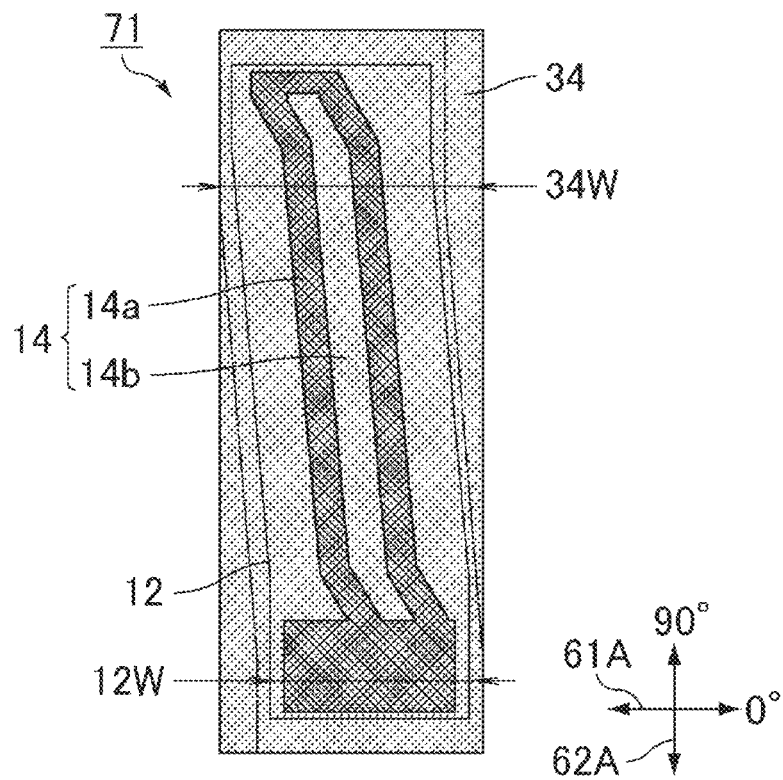
FIG. 23 is a schematic plan view showing arrangement of electrodes in one sub-pixel of a liquid crystal display device according to Comparative Example 1.
FIG. 24 is a table summarizing simulation results of display-mode switching in Example 1.

FIG. 23 is a schematic plan view showing arrangement of electrodes in one sub-pixel of a liquid crystal display device according to Comparative Example 1. As shown in FIG. 23, the liquid crystal display device according to Comparative Example 1 has the same structure as that of Example 1, except that each third electrode 34 had a width 34W of 20.0 μm in the widthwise direction of each sub-pixel and was disposed for the entire surface of each sub-pixel.

<Switching of Display Modes>

Concerning Example 1 and Comparative Example 1, the viewing angle characteristics were simulated in the first display mode and in the second display mode using an LCD master 3D (available from Shintec Co., Ltd.). For the first display mode, simulation was made in the conditions that, with the common voltage defined as 0 V, the second electrodes were set to 0 V and an alternating voltage of 0 to 4 V was applied to the first electrodes while an alternating voltage of 4 V was applied to the third electrodes. For the second display mode, simulation was made in the conditions that the second electrodes and the third electrodes were set to 0 V and an alternating voltage of 0 to 4 V was applied to the first electrodes. The simulations of viewing angle characteristics were made by simulating the contrast ratios in observation of the display panel in the polar angle range of 0° to 80° and in the azimuth range of 0° azimuth to 360° azimuth. The resulting simulation figures each show contrast ratios indicated by contour lines. An azimuth having a high contrast ratio is considered to achieve good perception. The term "front contrast ratio" means the contrast ratio in observation of the liquid crystal panel from the front (at a polar angle of 0°). Herein, each maximum contrast ratio was calculated with the front contrast ratio of a liquid crystal display device defined as 1000 which has the same structure as that of Example 1 but does not include the third electrodes.

Figures 25, 26:
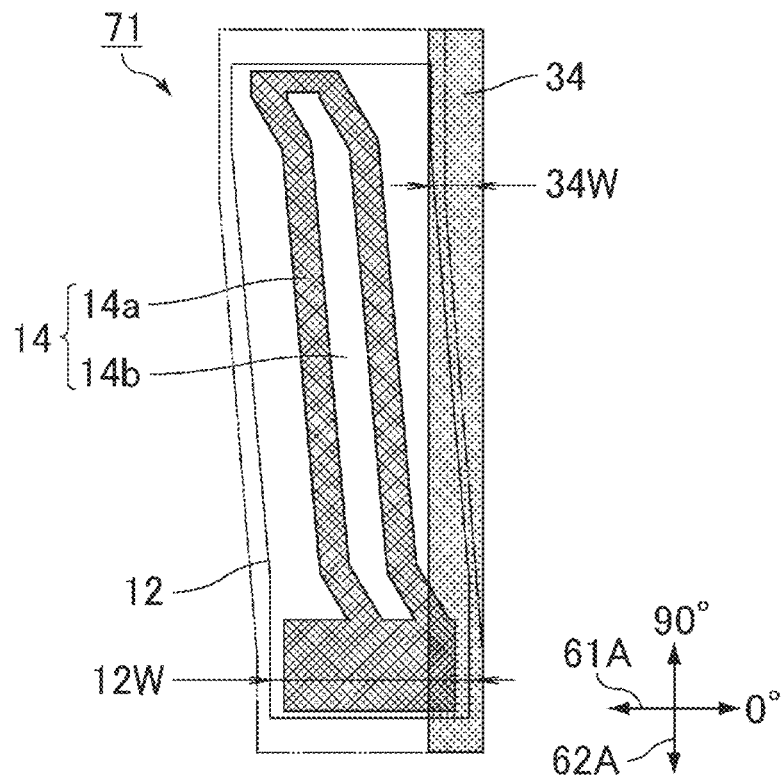
FIG. 25 is a table summarizing simulation results of display-mode switching in Comparative Example 1.
FIG. 26 is a schematic plan view showing arrangement of electrodes in one sub-pixel of a liquid crystal display device according to Example 2.
Figure 27:
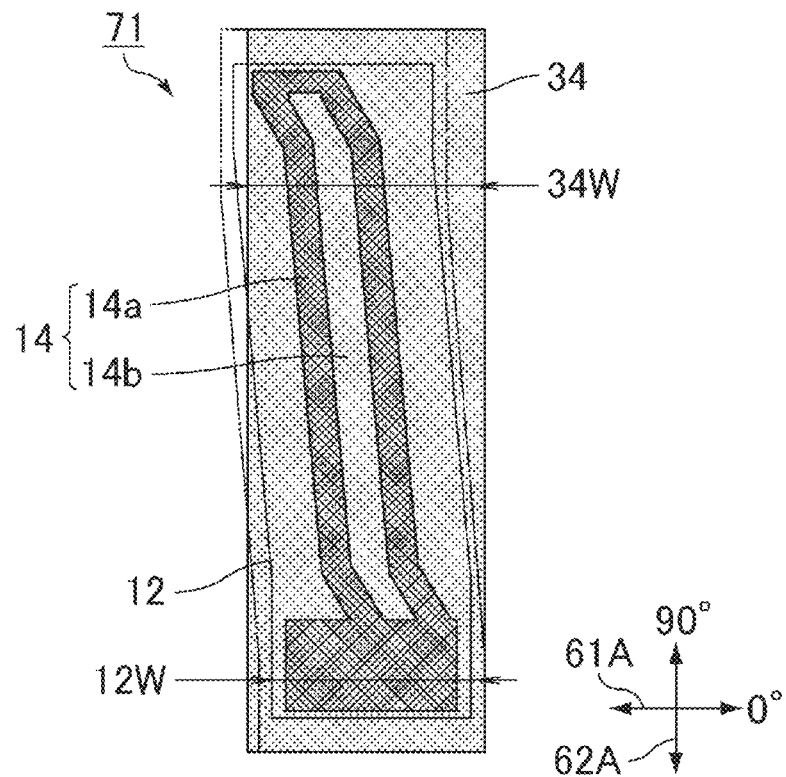
FIG. 27 is a schematic plan view showing arrangement of electrodes in one sub-pixel of a liquid crystal display device according to Comparative Example 2.
Figure 28:
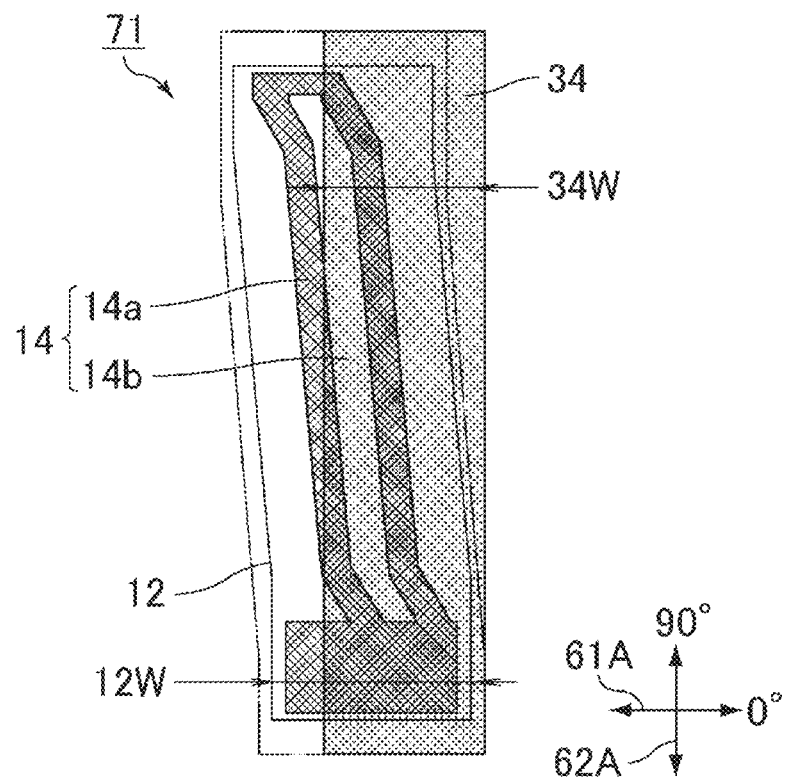
FIG. 28 is a schematic plan view showing arrangement of electrodes in one sub-pixel of a liquid crystal display device according to Comparative Example 3.

FIG. 24 is a table summarizing simulation results of display-mode switching in Example 1. FIG. 25 is a table summarizing simulation results of display-mode switching in Comparative Example 1. In FIG. 24 and FIG. 25, the counter voltage means the voltage applied to the third electrodes 34. As shown in FIG. 24, with voltage applied to the third electrodes 34, Example 1 achieved switching from the second display mode that provides good perception from the up-down directions (90°-270° azimuth) and from the left-right directions (0°-180° azimuths) to the first display mode that provides good perception from the up-down directions and poor perception from the left-right directions.

Furthermore, the first display mode of Example 1 achieved bilaterally asymmetric viewing angle characteristics providing better perception from the right direction (0° azimuth) than from the left direction (180° azimuth). In the simulation figure of the first display mode shown in FIG. 24, the dotted line indicates an axis (90°-270° azimuth line) passing the center point. As shown in FIG. 24, the case in which the contrast ratio was not axisymmetric but asymmetric with respect to the axis passing the center point was considered to be bilaterally asymmetric. In FIG. 24 and the later-described FIG. 25, FIG. 30, and FIG. 34 to FIG. 36, the values in the simulation figures each indicate the contrast ratio measured at a polar angle marked with ×.

Example 2 and Comparative Examples 2 to 4

Liquid crystal display devices according to Example 2 and Comparative Examples 2, 3, and 4 have the same structures as that of Example 1 except that the widths 34W of each third electrode 34 in the widthwise direction of each sub-pixel were 5.1 μm, 15.2 μm, 10.1 μm, and 2.2 μm, respectively. FIG. 26 to FIG. 29 are schematic plan views showing arrangement of electrodes in one sub-pixel of the liquid crystal display devices according to Example 2 and Comparative Examples 2 to 4.

<Viewing Angle Characteristics in First Display Mode>

Concerning Example 2 and Comparative Examples 2 to 4, the viewing angle characteristics in the first display mode were simulated in the same manner as in Example 1 using an LCD master 3D (available from Shintec Co., Ltd.). FIG. 30 is a table summarizing simulation results in the first display mode in Examples 1 and 2 and Comparative Examples 1 to 4. In FIG. 30, a represents the ratio of the width 34W of each third electrode 34 in the widthwise direction of each sub-pixel to the width 12W of each first electrode 12 in the widthwise direction of each sub-pixel. As shown in FIG. 30, Examples 1 and 2 in the first display mode each achieved bilaterally asymmetric viewing angle characteristics and thereby provided better perception from the right direction (0° azimuth) than from the left direction (180° azimuth). In contrast, Comparative Examples 1 to 3 provided bilaterally symmetric viewing angle characteristics in the first display mode. Comparative Example 4 failed to limit the perception from the left-right directions relative to the perception from the up-down directions and thus failed to achieve the first display mode.

Figure 31:
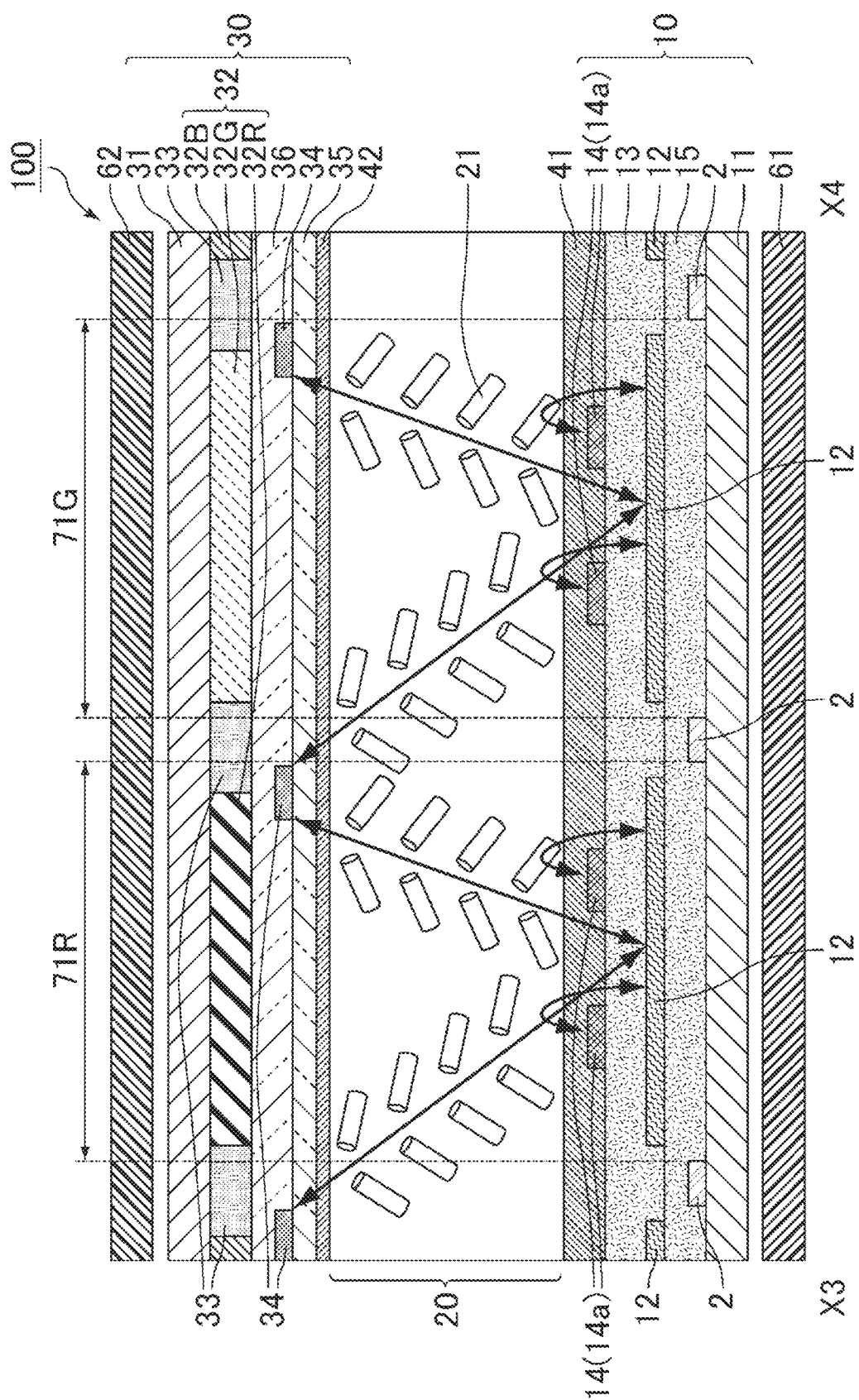
FIG. 31 is a schematic cross-sectional view of two sub-pixels of the liquid crystal display device according to Example 1.
Figure 32:
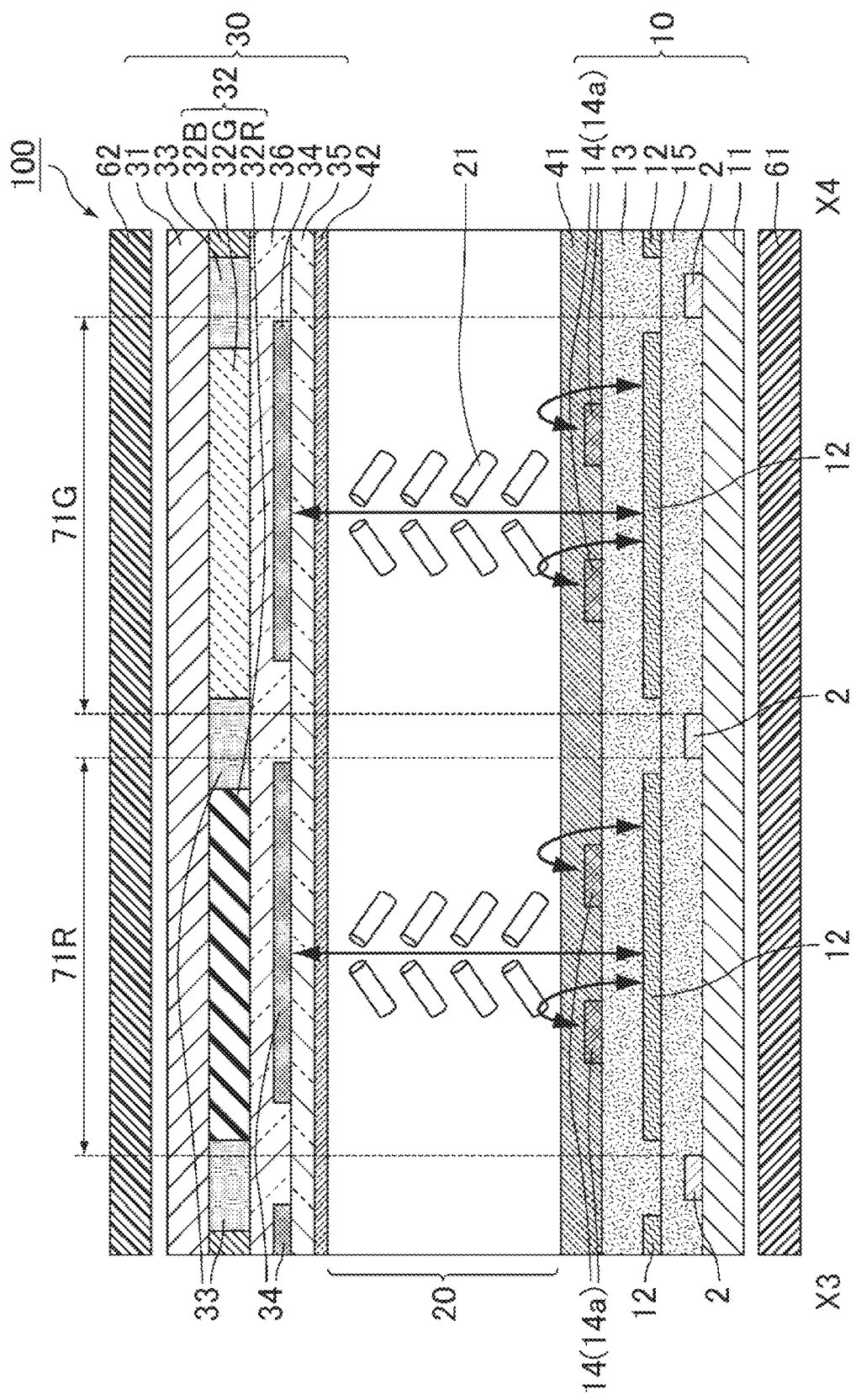
FIG. 32 is a schematic cross-sectional view of two sub-pixels of the liquid crystal display device according to Comparative Example 2.
Figure 33:
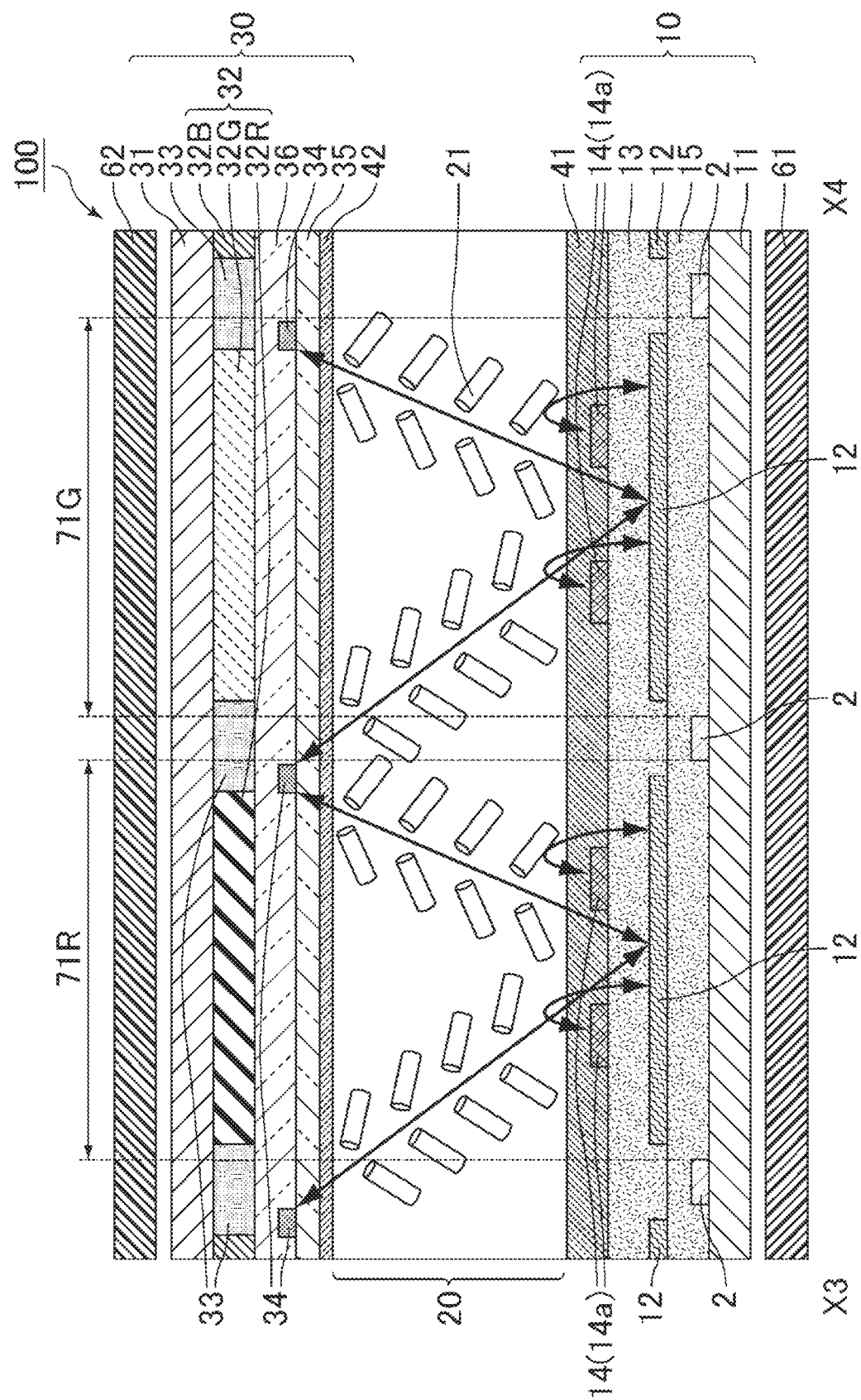
FIG. 33 is a schematic cross-sectional view of two sub-pixels of the liquid crystal display device according to Comparative Example 4.

The following describe differences in viewing angle characteristics in the first display mode between Example 1, Comparative Example 2, and Comparative Example 4 with reference to FIG. 31 to FIG. 33. FIG. 31 to FIG. 33 are each a cross-sectional view taken along the line X3-X4 in FIG. 1. A sub-pixel superimposed with a green color filter 32G is referred to as a green sub-pixel 71G, and a sub-pixel superimposed with a red color filter 32R is referred to as a red sub-pixel 71R.

FIG. 31 is a schematic cross-sectional view of two sub-pixels of the liquid crystal display device according to Example 1. As shown in FIG. 31, in Example 1 with a ratio α of 0.14, the green sub-pixel 71G has on its right side an oblique electric field in the thickness direction of the liquid crystal layer 20 between the third electrode 34 disposed at the right end of the green sub-pixel 71G and the first electrode 12 disposed in the green sub-pixel 71G. Meanwhile, the green sub-pixel 71G has on its left side an oblique electric field in the thickness direction of the liquid crystal layer 20 between the third electrode 34 disposed at the right end of the adjacent red sub-pixel 71R and the first electrode 12 disposed in the green sub-pixel 71G. Thus, asymmetric electric fields are formed on the right side and the left side of the green sub-pixel 71G, whereby the viewing angle characteristics are different between observation of the green sub-pixel 71G from the right direction and observation thereof from the left direction. Similarly in Example 2 with a ratio α of 0.25, the viewing angle characteristics were confirmed to be different between from the right direction and from the left direction in observation of the sub-pixel.

FIG. 32 is a schematic cross-sectional view of two sub-pixels of the liquid crystal display device according to Comparative Example 2. In Comparative Example 2, the ratio α is 0.75, and the width 34W of each third electrode 34 is wider and the area overlapping the first electrode 12 is larger as compared with Example 1. Thus, as shown in FIG. 32, the green sub-pixel 71G has an approximately vertical electric field in the thickness direction of the liquid crystal layer 20 between the third electrode 34 disposed in the green sub-pixel 71G and the first electrode 12 disposed in the green sub-pixel 71G. In Comparative Example 2, the vertical electric field is predominantly generated, while an oblique electric field is less likely to be generated between the third electrode 34 disposed in the adjacent red sub-pixel 71R and the first electrode 12 disposed in the green sub-pixel 71G. Thus, in Comparative Example 2, a symmetric electric field is formed on the right side and the left side of one sub-pixel, whereby the viewing angle characteristics are approximately symmetric between from the right direction and from the left direction in observation of the sub-pixel. Similarly in Comparative Examples 1 and 3, the viewing angle characteristics were confirmed to be approximately symmetric between from the right direction and from the left direction in observation of the sub-pixel.

FIG. 33 is a schematic cross-sectional view of two sub-pixels of the liquid crystal display device according to Comparative Example 4. As shown in FIG. 33, the green sub-pixel 71G has on its right side an oblique electric field in the thickness direction of the liquid crystal layer 20 between the third electrode 34 disposed at the right end of the green sub-pixel 71G and the first electrode 12 disposed in the green sub-pixel 71G. Meanwhile, the green sub-pixel 71G has on its left side an oblique electric field in the thickness direction of the liquid crystal layer 20 between the third electrode 34 disposed at the right end of the adjacent red sub-pixel 71R and the first electrode 12 disposed in the green sub-pixel 71G. However, in Comparative Example 4, the ratio α is 0.11, and the width 34W of each third electrode 34 is narrower and the area overlapping the first electrode 12 is smaller as compared with Example 1. Thus, the oblique electric fields formed on the right side and the left side of the green sub-pixel 71G are bilaterally symmetric, resulting in almost symmetric viewing angle characteristics in observation of the sub-pixel from the right direction and the left direction. Also, when the ratio α is smaller than 0.14, only an approximately horizontal electric field is formed even when voltage is applied to the third electrodes 34. Accordingly, the contrast ratio of the sub-pixel is high from both of the left-right directions, whereby the narrow viewing angle mode could not be achieved.

Examples 3 and 4 and Comparative Examples 5 to 7

In Examples 3 and 4 and Comparative Examples 5 to 7, studies were made after reducing the thickness of the liquid crystal layer as compared with Example 1, aiming to improve the response speed of the liquid crystal molecules. In Examples 3 and 4 and Comparative Examples 5 to 7, the thickness d: of the liquid crystal layer was 2.6 μm, and the birefringence index Δn of the liquid crystal material was set to be 0.13 so as to allow the retardation $\Delta n d_1$ of the liquid crystal layer to be about 330 nm. Except for the thickness d: of the liquid crystal layer and the birefringence index Δn of the liquid crystal material, the structure of the liquid crystal display device is the same between Example 3 and Example 2, between Example 4 and Example 1, between Comparative Example 5 and Comparative Example 2, between Comparative Example 6 and Comparative Example 3, and between Comparative Example 7 and Comparative Example 4.

Examples 5 and 6 and Comparative Examples 8 to 10

In Examples 5 and 6 and Comparative Examples 8 to 10, studies were made after further reducing the thickness of the liquid crystal layer as compared with Example 1, aiming to further improve the response speed of the liquid crystal molecules. In Examples 5 and 6 and Comparative Examples 8 to 10, the thickness $d_1$ of the liquid crystal layer was 2.2 μm, and the birefringence index Δn of the liquid crystal material was set to be 0.15 so as to allow the retardation $\Delta n d_1$ of the liquid crystal layer to be about 330 nm. Except for the thickness $d_1$ of the liquid crystal layer and the birefringence index Δn of the liquid crystal material, the structure of the liquid crystal display device was the same between Example 5 and Example 2, between Example 6 and Example 1, between Comparative Example 8 and Comparative Example 2, between Comparative Example 9 and Comparative Example 3, and between Comparative Example 10 and Comparative Example 4.

<Viewing Angle Characteristics in First Display Mode>

Concerning Examples 3 to 6 and Comparative Examples 5 to 10, the viewing angle characteristics in the first display mode were simulated in the same manner as in Example 1 using an LCD master 3D (available from Shintec Co., Ltd.). FIG. 34 is a table summarizing simulation results in the first display mode in Examples 3 and 4 and Comparative Examples 5 to 7. FIG. 35 is a table summarizing simulation results in the first display mode in Examples 5 and 6 and Comparative Examples 8 to 10. As shown in FIG. 34 and FIG. 35, Examples 3 to 6 each having a ratio α of 0.14 or greater and 0.25 or smaller had bilaterally asymmetric contrast ratios in the first display mode even when the thickness of the liquid crystal layer was 2.6 µm or 2.2 µm, to achieve bilaterally asymmetric viewing angle characteristics. In contrast, Comparative Examples 5, 6, 8, and 9 each having a ratio α of greater than 0.25 provided bilaterally symmetric viewing angle characteristics in the first display mode. Comparative Examples 7 and 10 each having a ratio α of smaller than 0.14 failed to limit the perception from the left-right directions relative to the perception from the up-down directions and thus failed to achieve the narrow viewing angle mode.

Example 7

A liquid crystal display device according to Example 7 has the same structure as that of Example 1 except that the backlight used was the directional backlight shown in FIG. 5. The directional backlight as shown in FIG. 5 causes a luminance change depending on the polar angle at which the liquid crystal panel is observed. In Example 7, as shown in FIG. 3, the third electrodes 34 were disposed at the right end of the sub-pixels, and the backlight was controlled to turn on the light source on the left side surface of the light guide plate in the first display mode.

In Example 7, the third electrodes 34 are disposed at the right end of the sub-pixels. Thus, the contrast ratio is high on the right side of the liquid crystal panel in the first display mode. In the first display mode, the control circuit turns on the left light source of the backlight. Light incident on the light guide plate 301 propagates from the left side to the right side of the light guide plate 301, and then backlight illumination is emitted from the right side of the light guide plate 301 toward the right side of the liquid crystal panel with a high contrast ratio. In contrast, backlight illumination is not emitted toward the left side of the liquid crystal panel with a low contrast ratio. Controlling the driving of the backlight as described above can clearly separate a region with a high contrast ratio and a region with a low contrast ratio. In a region with a low contrast ratio, the luminance may not be sufficiently reduced even in black display to possibly cause black level degradation of the screen. Such black level degradation can be reduced or prevented by not emitting backlight illumination in a region with a low contrast ratio.

Example 8

A liquid crystal display device according to Example 8 has the same structure as that of Example 6 except that the first alignment film 41 was changed to an alignment film having an anchoring energy of 1×10⁻⁷ J/m².
<Comparison in Mode Efficiency>

Concerning Example 1, Example 6, and Example 8, the mode efficiencies in the first display mode and in the second display mode were calculated, and the results are summarized in the following Table 1. The mode efficiencies are each represented by the following formula (2).

Mode efficiency (%)=(maximum luminance in crossed Nicols)/(luminance in parallel Nicols)× 100 (2)

Here, the maximum luminance in crossed Nicols is the maximum luminance when a pair of polarizers is arranged in crossed Nicols relative to the liquid crystal panel, the second electrodes are set to 0 V, and the voltage applied to the first electrodes is changed from 0 to 4 V. The luminance in parallel Nicols is the luminance with no voltage applied when a pair of polarizers is arranged in parallel Nicols relative to the liquid crystal panel. The luminance of each liquid crystal display device was estimated using an LCD Master 3D (available from Shintech Co., Ltd., Inc.).

TABLE 1

|  | Example 1 | Example 6 | Example 8 |
| --- | --- | --- | --- |
| Thickness of liquid crystal layer (µm) | 3.3 | 2.2 | 2.2 |
| Anchoring energy of first alignment film (J/m²) | 1 × 10⁻³ | 1 × 10⁻³ | 1 × 10⁻⁷ |
| Anchoring energy of second alignment film (J/m²) | 1 × 10⁻³ | 1 × 10⁻³ | 1 × 10⁻³ |
| Mode efficiency in first display mode (%) | 73 | 70 | 80 |
| Mode efficiency in second display mode (%) | 75 | 68 | 90 |

As shown in Table 1, in Example 6 in which the thickness of the liquid crystal layer was 2.2 µm, the mode efficiency in the wide viewing angle mode (second display mode) was lower than in Example 1 in spite that the retardation of the liquid crystal layer was controlled to be about 330 nm as in Example 1. In contrast, in Example 8 in which a weak anchoring film having a low anchoring energy was used as the first alignment film on the active matrix substrate side, the mode efficiency could be improved in the first display mode and in the second display mode even when the thickness of the liquid crystal layer was made to 2.2 µm as in Example 6.

Example 9

A liquid crystal display device according to Example 9 has the same structure as that of Example 1 except that a retardation film is disposed between the active matrix substrate 10 and the first polarizer 61 of the liquid crystal panel 100. As shown in FIG. 4, in the liquid crystal display device according to Example 9, the second polarizer 62, the liquid crystal panel 100, the positive C plate 63 (Rth=90 nm), the positive A plate 64 (Re=140 nm), and the first polarizer 61 were sequentially disposed such that the second absorption axis 62A of the second polarizer was at an azimuth of 90°, the liquid crystal molecules with no voltage applied were aligned at an azimuth of 90°, the slow axis of the positive A plate (Re=140 nm) was at an azimuth of 90°, and the first absorption axis 61A of the first polarizer was at an azimuth of 0°.
<Switching of Display Modes>

Concerning Example 9, the viewing angle characteristics in the first display mode and in the second display mode were simulated in the same manner as in Example 1 using an LCD master 3D (available from Shintec Co., Ltd.). FIG. 36 is a table summarizing simulation results of display-mode switching in Example 9. As shown in FIG. 36, Example 9 succeeded in switching from the second display mode to the first display mode and achieving bilaterally asymmetric viewing angle characteristics in the first display mode and thereby providing better perception from the right direction (0° azimuth) than from the left direction (180° azimuth), by applying a voltage to the third electrodes. Furthermore, presence of the retardation film could achieve a higher maximum contrast ratio than in Example 1 both in the first display mode and in the second display mode.

What is claimed is:

1. A liquid crystal display device comprising:
a liquid crystal panel; and
a control circuit,
the liquid crystal panel including sub-pixels arranged in a matrix pattern in an in-plane direction and sequentially including an active matrix substrate, a first alignment film, a liquid crystal layer containing liquid crystal molecules, a second alignment film, and a counter substrate,
the active matrix substrate sequentially including a first substrate, a first electrode disposed for each sub-pixel, a first insulating layer, and a second electrode including a linear electrode portion,
the counter substrate including a second substrate and a third electrode,
the third electrode extending in a longitudinal direction of the sub-pixel at a right end or a left end of the sub-pixel with a widthwise direction of the sub-pixel defined as a left-right direction,
a ratio of a width of the third electrode in the widthwise direction to a width of the first electrode in the widthwise direction being 0.14 or greater and 0.25 or smaller,
the control circuit being configured to switch between application of an alternating voltage and application of a constant voltage to the third electrode.

2. The liquid crystal display device according to claim 1, wherein the control circuit is configured to switch between a first display mode that allows a first image to be observable in a narrow viewing angle range including a direction normal to the liquid crystal panel and a second display mode that allows the first image to be observable in a wide viewing angle range including the narrow viewing angle range,
the control circuit applies an alternating voltage to the third electrode in the first display mode, and
the control circuit applies a constant voltage, which is common to the first electrode or the second electrode, to the third electrode in the second display mode.

3. The liquid crystal display device according to claim 2, wherein the liquid crystal panel includes display units that utilize a veil-view function to display an image,
the display units each include a pair of sub-pixels arranged adjacent to each other, one of the sub-pixels being a first sub-pixel selected from odd-number lines and the other being a second sub-pixel selected from even-number lines, and
the control circuit is configured to supply different image signals to the respective sub-pixels so as to allow a second image, different from the first image, to be observable in the wide viewing angle range.

4. The liquid crystal display device according to claim 1, wherein the third electrode does not overlap the linear electrode portion of the second electrode in a plan view.

5. The liquid crystal display device according to claim 1, wherein the counter substrate includes a dielectric layer between the third electrode and the second alignment film.

6. The liquid crystal display device according to claim 1, wherein the first alignment film or the second alignment film has an anchoring energy of $1 \times 10^{-7}$ J/m$^2$ or less.

7. The liquid crystal display device according to claim 1, wherein the liquid crystal panel is further provided with a first polarizer on the active matrix substrate side, a second polarizer on the counter substrate side, and a retardation film between the active matrix substrate and the first polarizer.

8. The liquid crystal display device according to claim 1, wherein the liquid crystal display device further comprises a backlight on an active matrix substrate side of the liquid crystal panel, and
the backlight includes: a light guide plate whose left-right direction correspond to the widthwise direction of the sub-pixel of the liquid crystal panel; two light sources individually disposed on a right side surface and a left side surface of the light guide plate; a reflector on a back surface of the light guide plate; and an optical film between the light guide plate and the liquid crystal panel.

9. The liquid crystal display device according to claim 8, wherein the control circuit is configured to switch between a first display mode that allows a first image to be observable in a narrow viewing angle range including a direction normal to the liquid crystal panel and a second display mode that allows the first image to be observable in a wide viewing angle range including the narrow viewing angle, and
in the first display mode, the control circuit turns on the light source on the left side surface of the light guide plate of the two light sources when the third electrode is at the right end of the sub-pixel, and turns on the light source on the right side surface of the light guide plate of the two light sources when the third electrode is at the left end of the sub-pixel.

* * * * *